US012700216B2

(12) United States Patent
Ma et al.

(10) Patent No.: US 12,700,216 B2
(45) Date of Patent: Aug. 4, 2026

(54) SALIENCY-GUIDED MIXUP WITH OPTIMAL RE-ARRANGEMENTS FOR EFFICIENT DATA AUGMENTATION

(71) Applicant: SAMSUNG ELECTRONICS CO., LTD., Suwon-si (KR)

(72) Inventors: Bojie Ma, Maple (CA); Mikita Dvornik, Toronto (CA); Ran Zhang, Toronto (CA); Konstantinos Derpanis, Toronto (CA); Afsaneh Fazly, Aurora (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 407 days.

(21) Appl. No.: 18/201,521

(22) Filed: May 24, 2023

(65) Prior Publication Data

US 2024/0144652 A1     May 2, 2024

Related U.S. Application Data

(60) Provisional application No. 63/416,694, filed on Oct. 17, 2022.

(51) Int. Cl.
*G06V 10/771* (2022.01)
*G06V 10/774* (2022.01)
*G06V 10/80* (2022.01)

(52) U.S. Cl.
CPC .......... *G06V 10/771* (2022.01); *G06V 10/774* (2022.01); *G06V 10/80* (2022.01)

(58) Field of Classification Search
None
See application file for complete search history.

(56) References Cited

U.S. PATENT DOCUMENTS

2024/0211541 A1* 6/2024 Belharbi ................ G16H 30/40

OTHER PUBLICATIONS

Al-Afandi, Jalal, Balint Magyar, and Andras Horvath. "Saliency map based data augmentation." 2022 26th International Conference on Pattern Recognition (ICPR). IEEE, 2022. (Year: 2022).*
(Continued)

*Primary Examiner* — Matthew C Bella
*Assistant Examiner* — Johnny B Duong
(74) *Attorney, Agent, or Firm* — Sughrue Mion, PLLC

(57) ABSTRACT

The present disclosure provides methods, apparatuses, and computer-readable mediums for performing data augmentation. In some embodiments, a method of performing data augmentation by a device includes obtaining a plurality of images from a dataset. The method further includes computing, for each image of the plurality of images, a corresponding saliency map based on a gradient of a full loss function of that image. The method further includes selecting, from a subset of arrangements of a plurality of possible arrangements, a rearrangement offset that maximizes an overall saliency of a resulting image combining the plurality of images. The method further includes generating, using the rearrangement offset and a plurality of mixing ratios, a new mixed image from the plurality of images and a new mixed label from corresponding labels of the plurality of images. The method further includes augmenting the dataset with the new mixed image and the new mixed label.

18 Claims, 8 Drawing Sheets

(56)                    References Cited

OTHER PUBLICATIONS

Choi, Jaehyeop, et al. "SalfMix: a novel single image-based data augmentation technique using a saliency map." Sensors 21.24 (2021): 8444. (Year: 2021).*

Uddin, A. F. M., et al. "Saliencymix: A saliency guided data augmentation strategy for better regularization." arXiv preprint arXiv: 2006.01791 (2020). (Year: 2020).*

Huang, Shaoli, Xinchao Wang, and Dacheng Tao. "Snapmix: Semantically proportional mixing for augmenting fine-grained data." Proceedings of the AAAI conference on artificial intelligence. vol. 35. No. 2. 2021. (Year: 2021).*

Kim, Jang-Hyun, et al. "Co-mixup: Saliency guided joint mixup with supermodular diversity." arXiv preprint arXiv:2102.03065 (2021). (Year: 2021).*

Kim, Jang-Hyun, Wonho Choo, and Hyun Oh Song. "Puzzle mix: Exploiting saliency and local statistics for optimal mixup." International conference on machine learning. PMLR, 2020. (Year: 2020).*

Yun, Sangdoo, et al. "Cutmix: Regularization strategy to train strong classifiers with localizable features." Proceedings of the IEEE/CVF international conference on computer vision. 2019. (Year: 2019).*

An et al., "Saliency guided data augmentation strategy for maximally utilizing an object's visual information," https://doi.org/10.1371/joumal.pone.0274767, Oct. 2022, Total 7 pages.

Uddin et al., "Saliencymix: a Saliency Guided Data Augmentation Strategy for Better Regularization," conference paper at ICLR, 2021, Total 12 pages.

Choi et al., "SalfMix: A Novel Single Image-Based Data Augmentation Technique Using a Saliency Map," Sensors (Basel), doi: 10.3390/s21248444, Dec. 2021, Total 51 pages.

* cited by examiner

Figure 4:
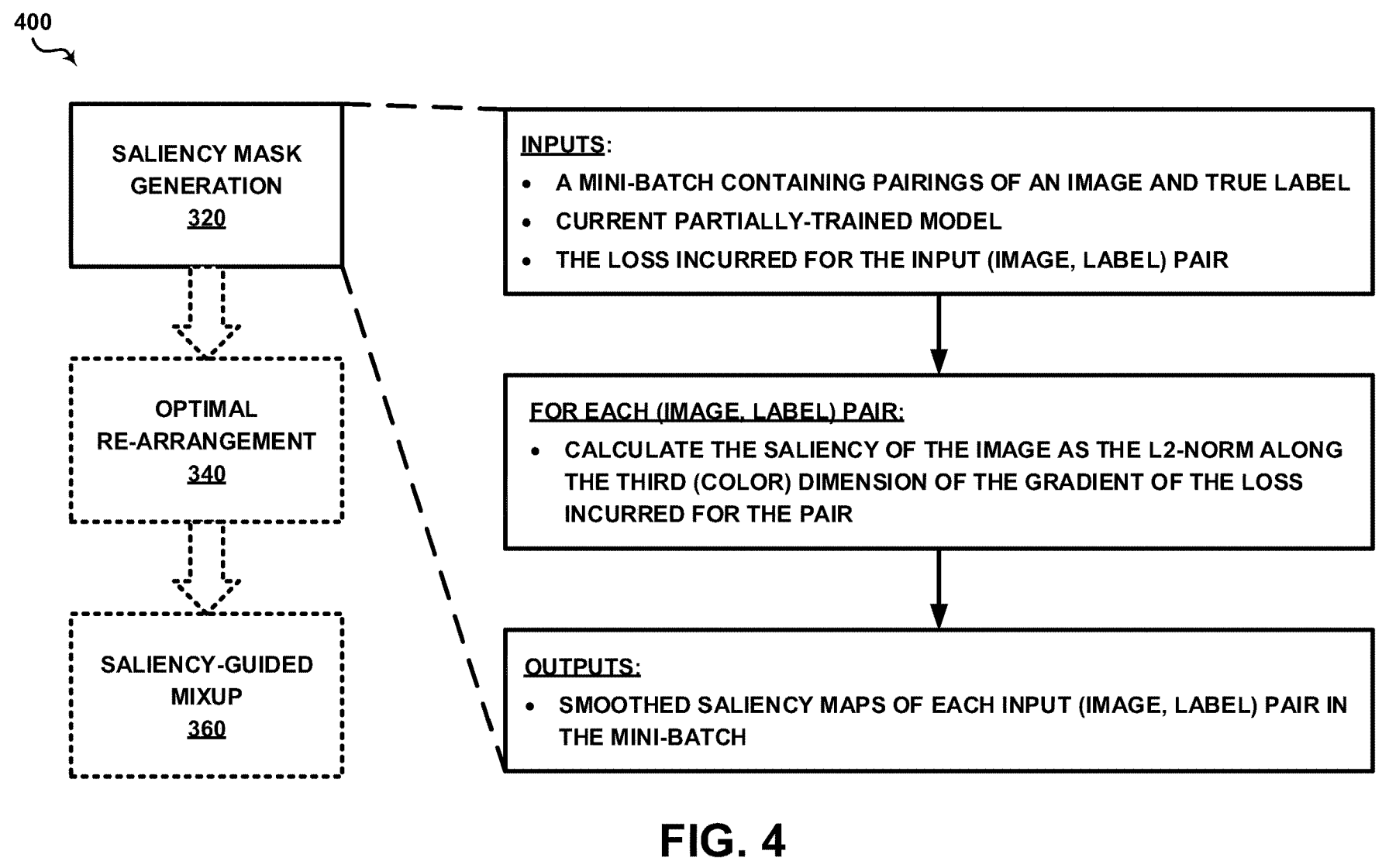

INPUTS:
- A MINI-BATCH CONTAINING PAIRINGS OF AN IMAGE AND TRUE LABEL
- CURRENT PARTIALLY-TRAINED MODEL
- THE LOSS INCURRED FOR THE INPUT (IMAGE, LABEL) PAIR

FOR EACH (IMAGE, LABEL) PAIR:
- CALCULATE THE SALIENCY OF THE IMAGE AS THE L2-NORM ALONG THE THIRD (COLOR) DIMENSION OF THE GRADIENT OF THE LOSS INCURRED FOR THE PAIR

OUTPUTS:
- SMOOTHED SALIENCY MAPS OF EACH INPUT (IMAGE, LABEL) PAIR IN THE MINI-BATCH

SALIENCY MASK GENERATION 320

OPTIMAL RE-ARRANGEMENT 340

SALIENCY-GUIDED MIXUP 360

Figure 5:
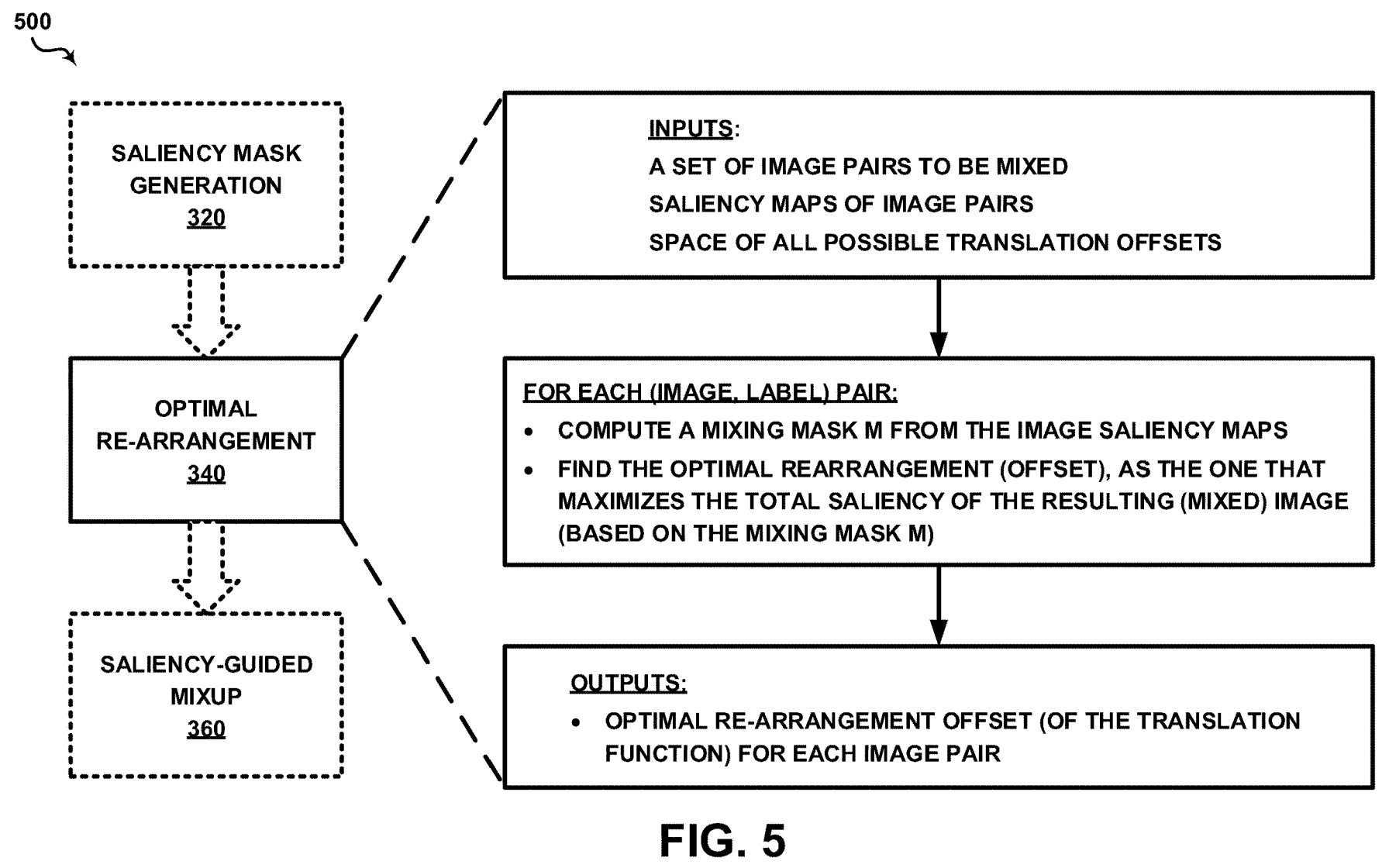

INPUTS:

A SET OF IMAGE PAIRS TO BE MIXED

SALIENCY MAPS OF IMAGE PAIRS

SPACE OF ALL POSSIBLE TRANSLATION OFFSETS

FOR EACH (IMAGE, LABEL) PAIR:

- COMPUTE A MIXING MASK M FROM THE IMAGE SALIENCY MAPS
- FIND THE OPTIMAL REARRANGEMENT (OFFSET), AS THE ONE THAT MAXIMIZES THE TOTAL SALIENCY OF THE RESULTING (MIXED) IMAGE (BASED ON THE MIXING MASK M)

OUTPUTS:

- OPTIMAL RE-ARRANGEMENT OFFSET (OF THE TRANSLATION FUNCTION) FOR EACH IMAGE PAIR

SALIENCY MASK GENERATION 320

OPTIMAL RE-ARRANGEMENT 340

SALIENCY-GUIDED MIXUP 360

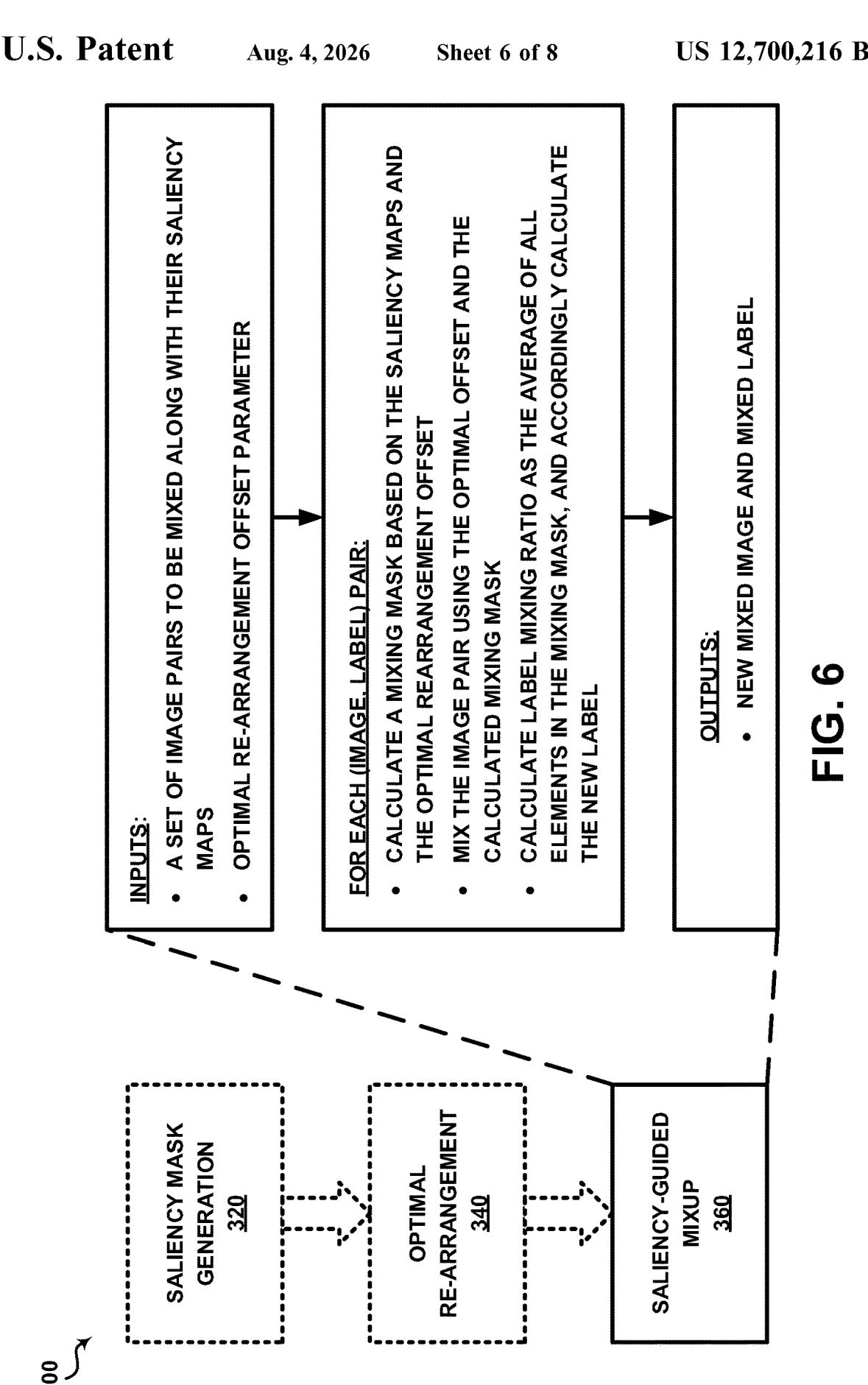

INPUTS:
- A SET OF IMAGE PAIRS TO BE MIXED ALONG WITH THEIR SALIENCY MAPS
- OPTIMAL RE-ARRANGEMENT OFFSET PARAMETER

FOR EACH (IMAGE, LABEL) PAIR:
- CALCULATE A MIXING MASK BASED ON THE SALIENCY MAPS AND THE OPTIMAL REARRANGEMENT OFFSET
- MIX THE IMAGE PAIR USING THE OPTIMAL OFFSET AND THE CALCULATED MIXING MASK
- CALCULATE LABEL MIXING RATIO AS THE AVERAGE OF ALL ELEMENTS IN THE MIXING MASK, AND ACCORDINGLY CALCULATE THE NEW LABEL

OUTPUTS:
- NEW MIXED IMAGE AND MIXED LABEL

SALIENCY MASK GENERATION 320

OPTIMAL RE-ARRANGEMENT 340

SALIENCY-GUIDED MIXUP 360

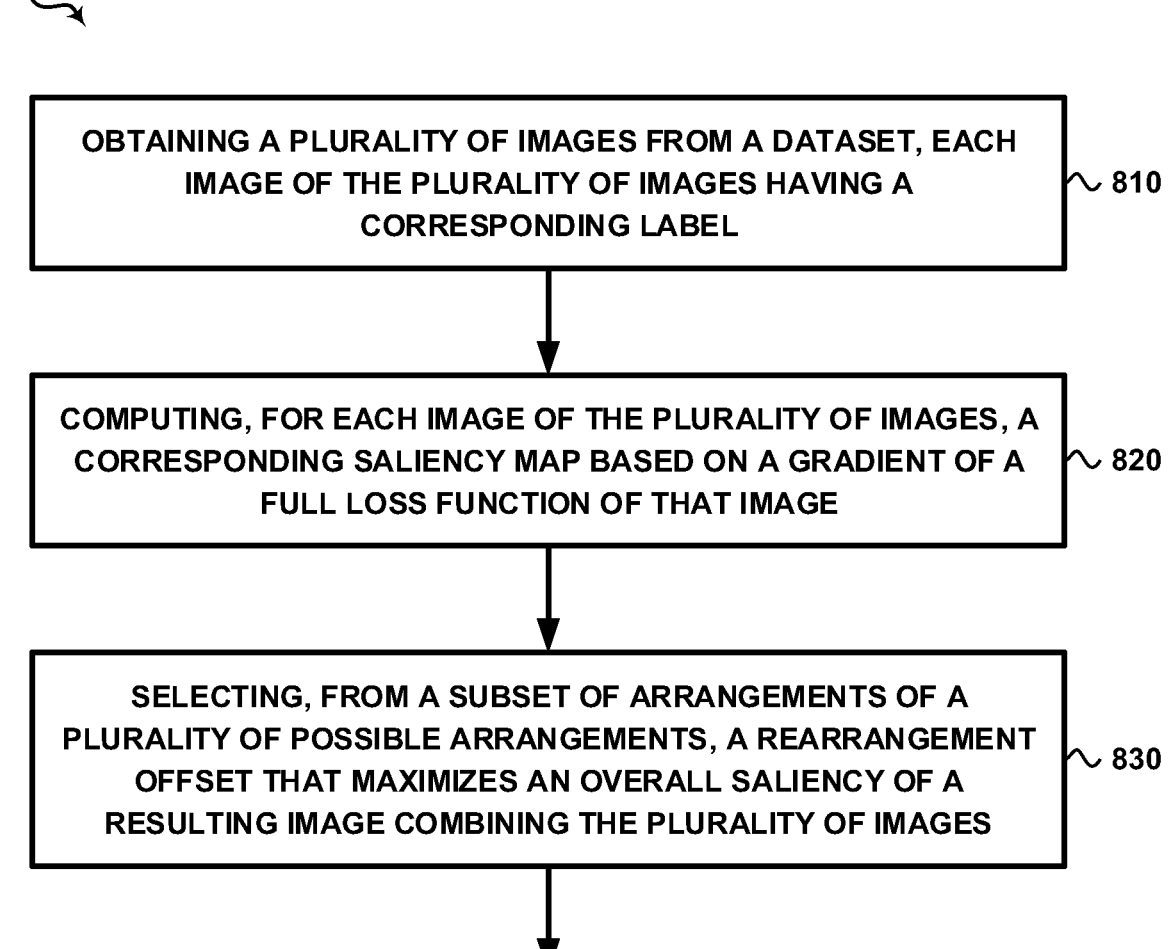

OBTAINING A PLURALITY OF IMAGES FROM A DATASET, EACH IMAGE OF THE PLURALITY OF IMAGES HAVING A CORRESPONDING LABEL ⟶ 810

COMPUTING, FOR EACH IMAGE OF THE PLURALITY OF IMAGES, A CORRESPONDING SALIENCY MAP BASED ON A GRADIENT OF A FULL LOSS FUNCTION OF THAT IMAGE ⟶ 820

SELECTING, FROM A SUBSET OF ARRANGEMENTS OF A PLURALITY OF POSSIBLE ARRANGEMENTS, A REARRANGEMENT OFFSET THAT MAXIMIZES AN OVERALL SALIENCY OF A RESULTING IMAGE COMBINING THE PLURALITY OF IMAGES ⟶ 830

GENERATING, USING THE REARRANGEMENT OFFSET AND A PLURALITY OF MIXING RATIOS BASED ON THE CORRESPONDING SALIENCY MAPS, A NEW MIXED IMAGE FROM THE PLURALITY OF IMAGES AND A NEW MIXED LABEL FROM CORRESPONDING LABELS OF THE PLURALITY OF IMAGES ⟶ 840

AUGMENTING THE DATASET WITH THE NEW MIXED IMAGE AND THE NEW MIXED LABEL ⟶ 850

FIG. 8

SALIENCY-GUIDED MIXUP WITH OPTIMAL RE-ARRANGEMENTS FOR EFFICIENT DATA AUGMENTATION

CROSS-REFERENCE TO RELATED APPLICATIONS

This application claims benefit of priority under 35 U.S.C. § 119 to U.S. Provisional Patent Application No. 63/416,694, filed on Oct. 17, 2022, in the U.S. Patent and Trademark Office, the disclosure of which is incorporated by reference herein in its entirety.

BACKGROUND

1. Field

The present disclosure relates generally to data augmentation, and more particularly to methods, apparatuses, and non-transitory computer-readable mediums for performing saliency-guided mixup with optimal re-arrangements (SAGE) for data augmentation.

2. Description of Related Art

Data augmentation may refer to techniques that may synthetically expand a dataset used for training models by applying transformations on available training samples. For example, related data augmentation techniques may include, but not be limited to, applying random geometric (e.g., translation, rotation, flipping) and/or photometric (e.g., contrast, brightness, sharpness) transformations to create slightly altered copies of the original images, and thus may provide a limited diversity to the augmented dataset. Other related data augmentation techniques may combine multiple training samples to create a new image-label pair. However, such data augmentation techniques may be agnostic to image semantics (e.g., image object location cues), and as a result, may produce ambiguous scenes with occluded distinctive regions.

To account for such shortcomings, some related data augmentation techniques may use visual saliency to create new training examples. Typically, a saliency map may include information about the importance of different image regions. That is, a saliency map may include information about objects, the locations of the objects, and indications of information levels (e.g., "informativeness") of the different image regions. These data augmentation techniques may have an improved accuracy when compared to other related data augmentation techniques that may not rely on visual saliency. However, these data augmentation techniques may require a significant computational overhead (e.g., processing throughput, memory footprint, and the like) due to having to maximize saliency at every training step, for example. In addition, the resulting scenes produced by these data augmentation techniques may be composed of patches and/or may be unrealistic, which may lead to poor out-of-distribution (OOD) generalizations when training a model using the augmented dataset.

Thus, there exists a need for further improvements to data augmentation techniques, as the need for improved accuracy, robustness, and/or OOD performance may be constrained by limited computational resources. Improvements are presented herein. These improvements may also be applicable to other image classification technologies and/or other image processing technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing data augmentation by a device are disclosed by the present disclosure. Aspects of the present disclosure provide for performing saliency-guided mixup with optimal re-arrangements (SAGE) for data augmentation.

According to an aspect of the present disclosure, a method of performing data augmentation by a device is provided. The method includes obtaining a plurality of images from a dataset. Each image of the plurality of images has a corresponding label. The method further includes computing, for each image of the plurality of images, a corresponding saliency map based on a gradient of a full loss function of that image. The method further includes selecting, from a subset of arrangements of a plurality of possible arrangements, a rearrangement offset that maximizes an overall saliency of a resulting image combining the plurality of images. The method further includes generating, using the rearrangement offset and a plurality of mixing ratios based on the corresponding saliency maps, a new mixed image from the plurality of images and a new mixed label from corresponding labels of the plurality of images. The method further includes augmenting the dataset with the new mixed image and the new mixed label.

In some embodiments, the computing, for each image of the plurality of images, of the corresponding saliency map may include providing that image of the plurality of images to a classifier model, measuring the full loss function between an output of the classifier model and the corresponding label of that image, and obtaining the corresponding saliency map by calculating the gradient of the full loss function.

In some embodiments, the obtaining of the corresponding saliency map may include normalizing at least one dimension of the gradient of the full loss function, and applying a Gaussian smoothing parameter to the normalized gradient.

In some embodiments, the selecting of the rearrangement offset may include identifying the subset of arrangements from the plurality of possible arrangements. Each arrangement of the subset of arrangements may indicate a distinct positional translation of the plurality of images. The subset of arrangements may include a predetermined portion of the plurality of possible arrangements. The selecting of the rearrangement offset may further include calculating overall saliencies of sample images resulting from the distinct positional translations of the plurality of images indicated by the subset of arrangements. The selecting of the rearrangement offset may further include selecting, as the rearrangement offset, an arrangement from the subset of arrangements corresponding to a maximum overall saliency from among the overall saliencies.

In some embodiments, the identifying of the subset of arrangements may include randomly identifying the predetermined portion of the plurality of possible arrangements as the subset of arrangements. The predetermined portion may include approximately one percent (1%) of the plurality of possible arrangements.

In some embodiments, the generating of the new mixed image may include creating a two-dimensional (2D) mask including the plurality of mixing ratios corresponding to a ratio between saliencies of the plurality of images at each pixel location of the new mixed image. The generating of the new mixed image may further include mixing, using the 2D mask, the plurality of images, having been positioned according to the rearrangement offset, into the new mixed image.

In some embodiments, the generating of the new mixed label may include interpolating the corresponding labels of the plurality of images based on the overall saliency of the new mixed image.

In some embodiments, the plurality of images may include a first image, the first image having a first corresponding saliency map.

In some embodiments, the method may further include training a classifier model with the augmented dataset, and computing, using the trained classifier model, a new saliency map corresponding to the first image. The new saliency map may be different from the first corresponding saliency map.

According to an aspect of the present disclosure, an apparatus for performing data augmentation by a device is provided. The apparatus includes a memory storage storing computer-executable instructions, and a processor communicatively coupled to the memory storage. The processor is configured to execute the computer-executable instructions and cause the apparatus to obtain a plurality of images from a dataset. Each image of the plurality of images has a corresponding label. The processor is further configured to execute the instructions to compute, for each image of the plurality of images, a corresponding saliency map based on a gradient of a full loss function of that image. The processor is further configured to execute the instructions to select, from a subset of arrangements of a plurality of possible arrangements, a rearrangement offset that maximizes an overall saliency of a resulting image combining the plurality of images. The processor is further configured to execute the instructions to generate, using the rearrangement offset and a plurality of mixing ratios based on the corresponding saliency maps, a new mixed image from the plurality of images and a new mixed label from corresponding labels of the plurality of images. The processor is further configured to execute the instructions to augment the dataset with the new mixed image and the new mixed label.

In some embodiments, the processor may be further configured to execute the instructions to provide each image of the plurality of images to a classifier model, measure the full loss function between an output of the classifier model and the corresponding label of each image of the plurality of images, and obtain the corresponding saliency map by calculating the gradient of the full loss function.

In some embodiments, the processor may be further configured to execute the instructions to normalize at least one dimension of the gradient of the full loss function, and apply a Gaussian smoothing parameter to the normalized gradient.

In some embodiments, the processor may be further configured to execute the instructions to identify the subset of arrangements from the plurality of possible arrangements. Each arrangement of the subset of arrangements may indicate a distinct positional translation of the plurality of images. The subset of arrangements may include a predetermined portion of the plurality of possible arrangements.

The processor may be further configured to execute the instructions to calculate overall saliencies of sample images resulting from the distinct positional translations of the plurality of images indicated by the subset of arrangements. The processor may be further configured to execute the instructions to select, as the rearrangement offset, an arrangement from the subset of arrangements corresponding to a maximum overall saliency from among the overall saliencies.

In some embodiments, the processor may be further configured to execute the instructions to randomly identify the predetermined portion of the plurality of possible arrangements as the subset of arrangements. The predetermined portion may include approximately one percent (1%) of the plurality of possible arrangements.

In some embodiments, the processor may be further configured to execute the instructions to create a 2D mask including the plurality of mixing ratios corresponding to a ratio between saliencies of the plurality of images at each pixel location of the new mixed image. The processor may be further configured to execute the instructions to mix, using the 2D mask, the plurality of images, having been positioned according to the rearrangement offset, into the new mixed image.

In some embodiments, the processor may be further configured to execute the instructions to interpolate the corresponding labels of the plurality of images based on the overall saliency of the new mixed image.

In some embodiments, the plurality of images may include a first image. The first image may have a first corresponding saliency map.

In some embodiments, the processor may be further configured to execute the instructions to train a classifier model with the augmented dataset, and compute, using the trained classifier model, a new saliency map corresponding to the first image. The new saliency map may be different from the first corresponding saliency map.

According to an aspect of the present disclosure, a non-transitory computer-readable storage medium storing computer-executable instructions for performing data augmentation by a device is provided. The computer-executable instructions are configured, when executed by at least one processor of the device, to cause the device to obtain a plurality of images from a dataset. Each image of the plurality of images has a corresponding label. The computer-executable instructions further cause the device to compute, for each image of the plurality of images, a corresponding saliency map based on a gradient of a full loss function of that image. The computer-executable instructions further cause the device to select, from a subset of arrangements of a plurality of possible arrangements, a rearrangement offset that maximizes an overall saliency of a resulting image combining the plurality of images. The computer-executable instructions further cause the device to generate, using the rearrangement offset and a plurality of mixing ratios based on the corresponding saliency maps, a new mixed image from the plurality of images and a new mixed label from corresponding labels of the plurality of images. The computer-executable instructions further cause the device to augment the dataset with the new mixed image and the new mixed label.

In some embodiments, the computer-executable instructions may further cause the device to provide each image of the plurality of images to a classifier model, measure the full loss function between an output of the classifier model and the corresponding label of each image of the plurality of images, and obtain the corresponding saliency map by calculating the gradient of the full loss function.

In some embodiments, the computer-executable instructions may further cause the device to identify the subset of arrangements from the plurality of possible arrangements. Each arrangement of the subset of arrangements may indicate a distinct positional translation of the plurality of images. The subset of arrangements may include a predetermined portion of the plurality of possible arrangements. The computer-executable instructions may further cause the device to calculate overall saliencies of sample images resulting from the distinct positional translations of the plurality of images indicated by the subset of arrangements. The computer-executable instructions may further cause the device to select, as the rearrangement offset, an arrangement from the subset of arrangements corresponding to a maximum overall saliency from among the overall saliencies.

In some embodiments, the computer-executable instructions may further cause the device to create a 2D mask including the plurality of mixing ratios corresponding to a ratio between saliencies of the plurality of images at each pixel location of the new mixed image. The computer-executable instructions may further cause the device to mix, using the 2D mask, the plurality of images, having been positioned according to the rearrangement offset, into the new mixed image.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 4 illustrates an example of a saliency mask generation component, in accordance with various aspects of the present disclosure;

FIG. 5 illustrates an example of an optimal re-arrangement component, in accordance with various aspects of the present disclosure;

FIG. 6 depicts an example of a saliency-guided mixup component, in accordance with various aspects of the present disclosure;

FIG. 8 depicts a flowchart of an example method of performing data augmentation by a device, in accordance with various aspects of the present disclosure.

DETAILED DESCRIPTION

Figure 1:
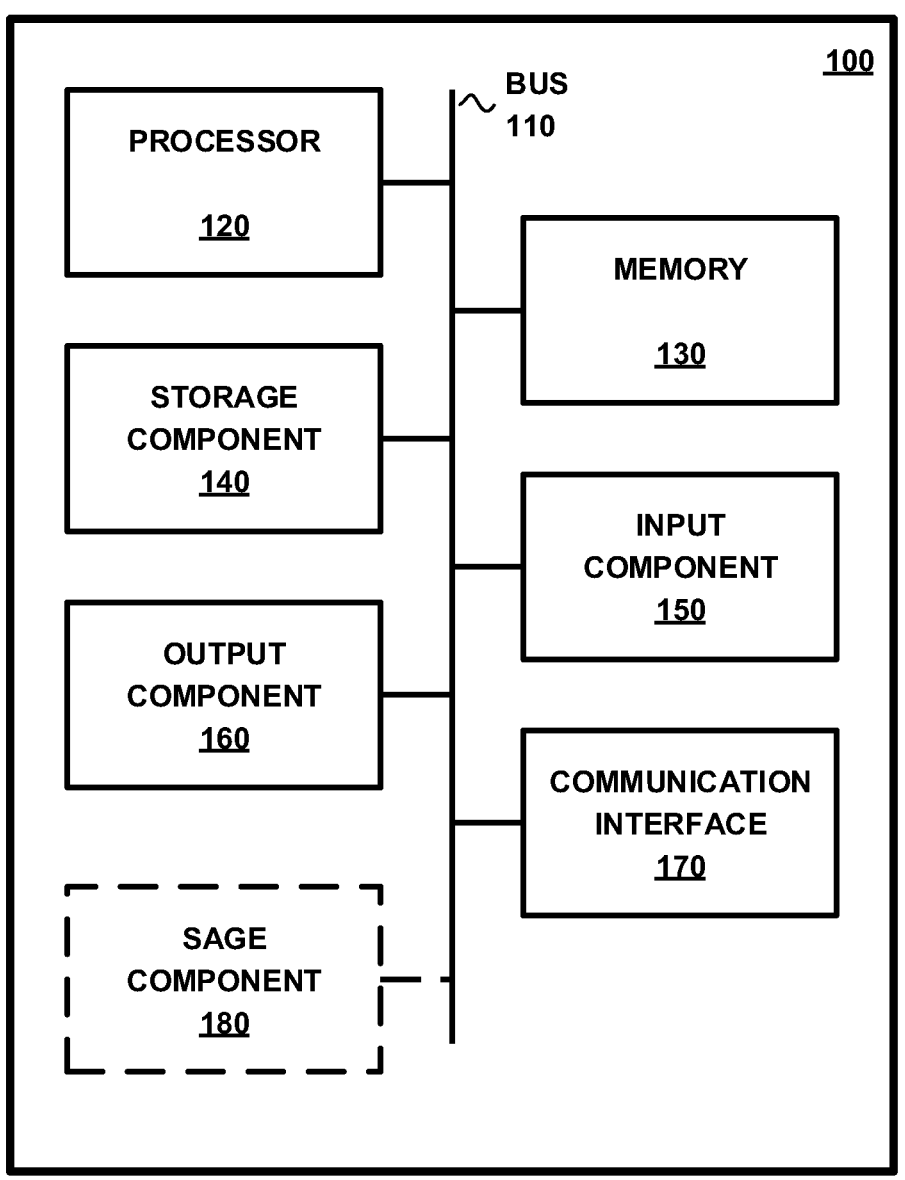
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, and non-transitory computer-readable mediums for performing data augmentation. Aspects described herein may be used to perform saliency-guided mixup with optimal re-arrangements (SAGE) for data augmentation.

As described herein, SAGE may refer to a data augmentation technique that may use visual saliency to perform optimal image blending of a plurality of images at each spatial location of the resulting blended image and/or may optimize the relative position of the plurality of images within the resulting blended image such that a visual saliency of the resulting blended image may be maximized. For example, given a plurality of images and their corresponding saliency maps, SAGE may provide for mixing together the plurality of images, such that at each spatial location, a contribution of each image of the plurality of images to the resulting image may be proportional to a saliency of that image in that spatial location. Alternatively or additionally, an optimal relative arrangement of the plurality of images may be found prior to the mixing stage in order to maximize a resulting saliency of the mixed image.

Furthermore, SAGE may provide a corresponding label to be associated with the resulting image that may be obtained by interpolating the original labels of the mixed images based on the saliency of the corresponding images.

In aspects described herein, the present disclosure provides apparatuses, methods, and non-transitory computer-readable mediums for performing data augmentation by a device. That is, the present disclosure provides a framework for performing SAGE that may combine multiple training samples to create a new image-label pair that may be used to augment a training dataset. In some aspects, the framework may include a saliency mask generation component, an optimal re-arrangement component, and a saliency-guided mixup component. The saliency mask generation component may compute saliency maps of the plurality of images. The optimal re-arrangement component may shift the plurality of images with respect to the other images. The saliency-guided mixup component may mix the shifted plurality of images.

The aspects described herein may provide several advantages over related data augmentation approaches by mixing images based on their visual images, which may promote foreground images (e.g., foreground objects) to be emphasized in the resulting blended image, and thereby, may produce blended images with improved accuracy and/or robustness, when compared to related data augmentation techniques. Alternatively or additionally, SAGE may produce smooth and realistic images with clear and distinct foreground objects without incurring in significant computational overhead (e.g., processing throughput, memory footprint, and the like).

As noted above, certain embodiments are discussed herein that relate to data augmentation by a device. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a main-frame computer, a microcomputer, a telephonic computing device, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a SAGE component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a micro-controller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine. The processor 120 also may be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, the SAGE component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EEPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Wireless-Fidelity (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an Institute of Electrical and Electronics Engineers (IEEE) 1394 (FireWire) interface, or the like.

In some embodiments, the device 100 may include the SAGE component 180, which may be configured to perform SAGE for data augmentation. For example, the SAGE component 180 may be configured to obtain a plurality of images, compute a corresponding saliency map, select a rearrangement offset that maximizes an overall saliency, generate a new mixed image and a new mixed label, and augment the dataset with the new mixed image and the new mixed label.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to performing data augmenting by a device.

Figure 2:
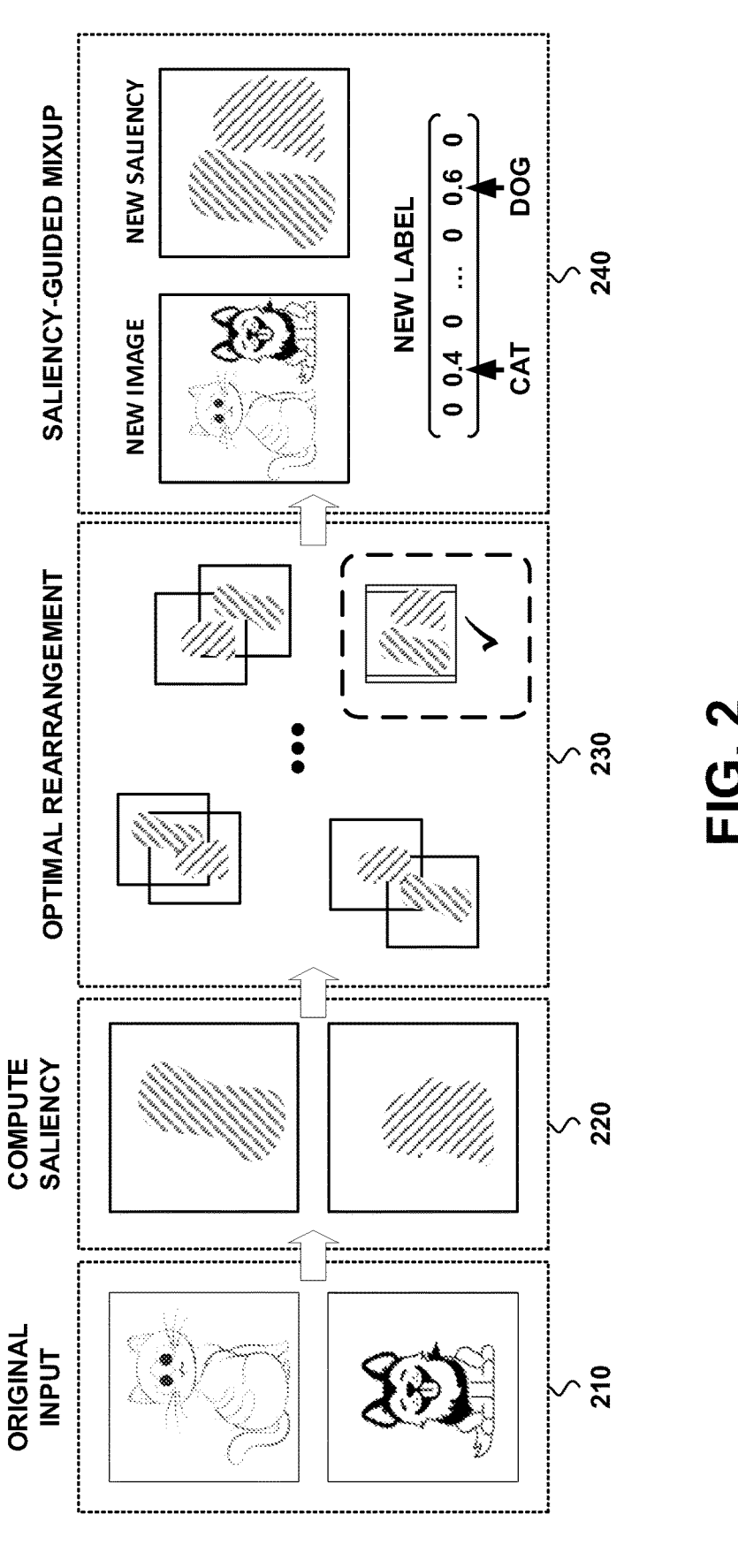
FIG. 2 illustrates an example of performing saliency-guided mixup with optimal re-arrangements (SAGE) for data augmentation, in accordance with various aspects of the present disclosure.

FIG. 2 illustrates an example of performing saliency-guided mixup with optimal re-arrangements for data augmentation, in accordance with various aspects of the present disclosure. The SAGE process 200 of FIG. 2 may include synthesizing new images (and/or their corresponding labels) by blending a plurality of training samples, using spatial saliency information as guidance for optimal blending.

In some embodiments, at least a portion of the SAGE process 200 may be performed by the device 100 of FIG. 1, which may include the SAGE component 180. Alternatively or additionally, another computing device (e.g., a server, a laptop, a smartphone, a user equipment (UE), a wearable device, a smart device, an IoT device, and the like) that includes the SAGE component 180 may perform at least a portion of the SAGE process 200.

Referring to FIG. 2, the SAGE process 200 may include obtaining a plurality of training samples from a dataset. Each training sample of the plurality of training samples may include an image and/or a video frame and a corresponding label. For example, as shown in operation 210, the SAGE process 200 may obtain a training sample of a dog and another training sample of a cat. Although FIG. 2 shows the SAGE process 200 obtaining two (2) training samples and each sample comprising a single object, it is to be understood that the present disclosure is not limited in this regard. That is, the operation 210 may include obtaining multiple training samples (e.g., three (3) or more), and/or each sample may contain different quantities of objects (e.g., two (2) or more). For example, in some embodiments, the operation 210 may include obtaining one sample containing two (2) objects and another sample containing three (3) objects. For another example, in other embodiments, the operation 210 may include obtaining three (3) samples.

In some embodiments, the training samples may be used to train a vision model. For example, the SAGE process 200 may be used to build practical vision models that may be more generalizable and/or may have improved performance in out-of-domain (OOD) and/or zero/few-shot settings, when compared to related data augmentation techniques. In an embodiment, the vision model may include a plurality of artificial neural network layers. The artificial neural network may include, but not be limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, and the like, or a combination of two or more thereof. The artificial intelligence model may, additionally or alternatively, include a software structure other than the hardware structure.

The vision model may be configured and/or trained to perform at least one of image classification, image search, natural-language based image search, object/people/pet detection, semantic segmentation, scene understanding, and the like. That is, the present disclosure is not limited in this regard. For example, the vision model may be configured to perform other applications without deviating from the scope of the disclosure. Alternatively or additionally, the vision model may be used in applications such as, but not limited to, retail operations, pet monitoring operations, security operations, medical applications, augmented reality (AR) applications, robotic control applications, navigation applications, and the like.

Continuing to refer to FIG. 2, the SAGE process 200 may compute, in operation 220, saliency maps for each sample obtained in operation 210. In operation 230, the SAGE process 200 may select, from a subset of arrangements of a plurality of possible arrangements, a rearrangement offset that may maximize an overall saliency of a resulting image combining the plurality of samples.

In operation 240, the SAGE process 200 may generate, using the rearrangement offset and a plurality of mixing ratios based on the corresponding saliency maps, a new mixed sample from the plurality of samples and a new mixed label from corresponding labels of the plurality of samples.

As discussed above, the new mixed sample generated by the SAGE process 200 may promote foreground images (e.g., foreground objects) to be emphasized in the resulting blended image, and thereby, may produce blended images with improved accuracy and/or robustness, when compared to related data augmentation techniques. Alternatively or additionally, the SAGE process 200 may produce smooth and realistic images with clear and distinct foreground objects without incurring in significant computational overhead (e.g., processing throughput, memory footprint, and the like).

Having discussed an example process that may be used to perform data augmentation, a number of embodiments are now discussed in further detail with reference to FIGS. 3 to 6. In particular, and as introduced above, some aspects of the present disclosure generally relate to performing saliency-guided mixup with optimal re-arrangements for data augmentation.

Figure 3:
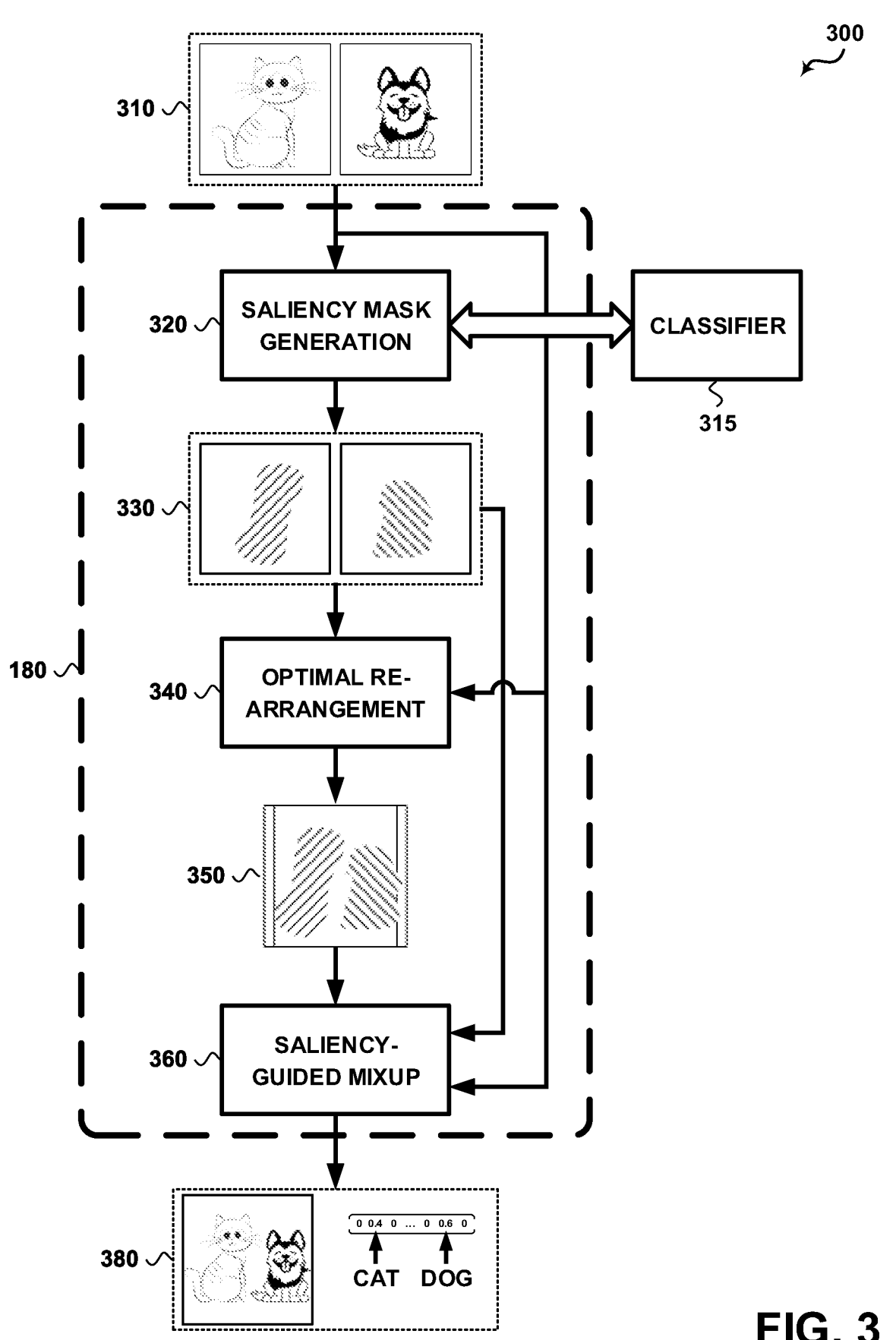
FIG. 3 depicts an example of a process flow for performing SAGE, in accordance with various aspects of the present disclosure.

FIG. 3 depicts an example of a process flow for performing SAGE, in accordance with various aspects of the present disclosure.

Referring to FIG. 3, a process flow 300 for performing SAGE by a device that implements one or more aspects of the disclosure is illustrated. In some embodiments, at least a portion of the operations and/or functions depicted by the process flow 300 may be performed by the device 100 of FIG. 1, which may include the SAGE component 180. Alternatively or additionally, another computing device (e.g., a server, a laptop, a smartphone, a UE, a wearable device, a smart device, an IoT device, and the like) that includes the SAGE component 180 may perform at least a portion of the process flow 300.

In some embodiments, the process flow 300 depicted in FIG. 3 may be used to implement the SAGE process 200 described with reference to FIG. 2 and may include additional features not mentioned above.

Referring to FIG. 3, a plurality of training samples 310 (e.g., a plurality of image, label pairs) may be obtained by the saliency mask generation component 320 of the SAGE component 180. Alternatively or additionally, the plurality of training samples 310 may be provided to the saliency mask generation component 320. Each training sample of the plurality of training samples may include an image and/or a video frame and a corresponding label. For example, as shown in FIG. 3, the saliency mask generation component 320 may obtain a training sample of a dog and another training sample of a cat. Although FIG. 3 shows the saliency mask generation component 320 obtaining two (2) training samples, each sample comprising a single object, it is to be understood that the present disclosure is not limited in this regard. That is, the saliency mask generation component 320 may obtain multiple training samples (e.g., three (3) or more), each sample containing different quantities of objects (e.g., two (2) or more). For example, in some embodiments, the plurality of training samples 310 may include one sample containing two (2) objects and another sample containing three (3) objects. For another example, in other embodiments, the plurality of training samples 310 may include three (3) samples.

In an embodiment, the plurality of training samples 310 may be randomly selected from an available training dataset. That is, the saliency mask generation component 320 may randomly select the plurality of training samples 310 to be blended by the SAGE component 180. Alternatively or additionally, the saliency mask generation component 320 may be provided with the plurality of training samples 310 that may have been randomly selected. However, the present disclosure is not limited in this regard. That is, the plurality of training samples 310 may be selected using any known selection method without deviating from the scope of the disclosure. For example, the plurality of training samples 310 may be selected based on selection criteria that may include, but not be limited to, creation timestamp, last access timestamp, access count, and the like.

The saliency mask generation component 320 may compute saliency maps based on a saliency that may consider the gradient of the full loss of the corresponding image. That is, saliency mask generation component 320 may compute, for each training sample of the plurality of training samples 310, a corresponding saliency map based on a gradient of a full loss function of that training sample. These saliency maps may be better suited for data augmentation and/or may allow for more efficient training, when compared to related saliency maps that may only consider the gradient of the ground-truth class activation map and/or may be based on only the portion of the image that may have been used to classify and/or identify the image.

In an embodiment, the saliency mask generation component 320 may provide each training sample of the plurality of training samples 310 to a classifier model 315. Alternatively or additionally, the saliency mask generation component 320 may measure the full loss function between an output of the classifier model 315 and the corresponding label of each training sample of the plurality of training samples 310. In an optional or additional embodiment, the saliency mask generation component 320 may obtain the saliency maps 330 by calculating the gradient of the full loss function.

In another optional or additional embodiment, the saliency mask generation component 320 may normalize at least one dimension of the gradient of the full loss function, and may apply a Gaussian smoothing parameter to the normalized gradient. That is, the saliency mask generation component 320 may provide, to an optimal re-arrangement component 340, a plurality of smoothed saliency maps 330 that correspond to the plurality of training samples 310. The saliency mask generation component 320 is described in further detail with reference to FIG. 4.

Continuing to refer to FIG. 3, the optimal re-arrangement component 340 may produce possible augmentations of the plurality of training samples 310. For example, the optimal re-arrangement component 340 may combine (e.g., mix, blend) the plurality of training samples 310 by shifting (e.g., positional translation) at least one training sample with respect to the remaining training samples of the plurality of training samples 310. In an embodiment, the optimal re-arrangement component 340 may determine one or more shifting operations that may maximize an overall saliency of a resulting training sample.

That is, the optimal re-arrangement component 340 may select, from a subset of arrangements of a plurality of possible arrangements, a rearrangement offset that maximizes an overall saliency of a resulting training sample combining the plurality of training samples 310. In an optional or additional embodiment, the optimal re-arrangement component 340 may identify the subset of arrangements from the plurality of possible arrangements. For example, each arrangement of the subset of arrangements may indicate a distinct positional translation of the plurality of training samples 310. Alternatively or additionally, the subset of arrangements may include a predetermined portion of the plurality of possible arrangements. For example, the predetermined portion may include approximately one percent (1%) of the plurality of possible arrangements. In another optional or additional embodiment, the subset of arrangements may be randomly selected from the predetermined portion of the plurality of possible arrangements. However, the present disclosure is not limited in this regard. That is, the subset of arrangements may be selected using any known selection method without deviating from the scope of the disclosure.

In another optional or additional embodiment, the optimal re-arrangement component 340 may calculate overall saliencies of sample blended images resulting from the distinct positional translations of the plurality of training samples indicated by the subset of arrangements. Alternatively or additionally, the optimal re-arrangement component 340 may select, as the rearrangement offset, an arrangement from the subset of arrangements that corresponds to a maximum overall saliency from among the overall saliencies. However, the present disclosure is not limited in this regard. That is, the rearrangement offset may be selected using any known selection method without deviating from the scope of the disclosure. For example, the optimal re-arrangement component 340 may select a rearrangement offset that may result in an overall saliency that exceeds a predetermined saliency threshold. For another additional or optional example, the optimal re-arrangement component 340 may select a rearrangement offset based on a positional alignment (e.g., vertical, horizontal) of the plurality of training samples in the resulting blended image.

The optimal re-arrangement component 340 is described in further detail with reference to FIG. 5.

As shown in FIG. 3, the saliency-guided mixup component 360 may generate a new training sample 380 (e.g., an image and label pair) by combining (e.g., mixing, blending) the plurality of training samples 310 according to the rearrangement offset produced by the optimal re-arrangement component 340. That is, the saliency-guided mixup component 360 may generate, using the rearrangement offset and a plurality of mixing ratios based on the corresponding saliency maps, a new mixed image 380 from the plurality of training samples 310 and a new mixed label 380 from corresponding labels of the plurality of training samples 310.

In an embodiment, the saliency-guided mixup component 360 may create a two-dimensional (2D) mask including the plurality of mixing ratios corresponding to a ratio between saliencies of the plurality of training samples 310 at each pixel location of the new mixed image 380. Alternatively or additionally, the saliency-guided mixup component 360 may mix, using the 2D mask, the plurality of training samples 310, having been positioned according to the rearrangement offset, into the new mixed image 380. In an optional or additional embodiment, the saliency-guided mixup component 360 may interpolate the corresponding labels of the plurality of training samples 310 based on the overall saliency of the new mixed image 380.

The saliency-guided mixup component 360 is described in further detail with reference to FIG. 6.

The new training sample 380 generated by the saliency-guided mixup component 360 may be used to augment a training dataset. For example, the new training sample 380 may be used to augment a dataset used to train the classifier model 315. That is, in an embodiment, the process flow 300 may include training the classifier model 315 with the augmented dataset. Alternatively or additionally, the re-trained classifier model 315 may be used to compute a new saliency map corresponding to the plurality of training samples 310. In an optional or additional embodiment, the new saliency map may be different from the previously-computed saliency maps corresponding to the plurality of training samples 310.

In some embodiments, the classifier model 315 may include a plurality of artificial neural network layers. The artificial neural network may include, but not be limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, and the like, or a combination of two or more thereof. The artificial intelligence model may, additionally or alternatively, include a software structure other than the hardware structure.

Having discussed an example process flow for performing SAGE, a number of embodiments are now discussed with reference to FIGS. 4 to 6 that describe in further detail the saliency mask generation component 320, optimal re-arrangement component 340, and the saliency-guided mixup component 360. In particular, and as introduced above, some aspects of the present disclosure generally relate to performing saliency-guided mixup with optimal re-arrangements for data augmentation.

FIG. 4 illustrates an example of a saliency mask generation component, in accordance with various aspects of the present disclosure. Referring to FIG. 4, a block diagram 400 of a saliency mask generation component 320 that implements one or more aspects of the disclosure is illustrated. In some embodiments, at least a portion of the saliency mask generation component 320 may be performed by the device 100 of FIG. 1, which may include the SAGE component 180. Alternatively or additionally, another computing device (e.g., a server, a laptop, a smartphone, a UE, a wearable device, a smart device, an IoT device, and the like) that includes the SAGE component 180 may perform at least a portion of the saliency mask generation component 320.

The saliency mask generation component 320 depicted by the block diagram 400 may include or may be similar in many respects to the saliency mask generation component 320 described above with reference to FIG. 3, and may include additional features not mentioned above. Alternatively or additionally, the saliency mask generation component 320 may perform at least one of the operations described above with reference to the operations 210 and 220 of FIG. 2.

The saliency mask generation component 320 may be provided as input at least one of a mini-batch containing pairings of an image and a true label (e.g., a plurality of training samples 310), a current partially-trained model (e.g., classifier model 315), and a loss incurred by the classifier model 315 for the plurality of training samples 310. For example, the saliency mask generation component 320 may obtain the plurality of training samples 310 as described above with reference to FIGS. 2 and 3. Alternatively or additionally, the saliency mask generation component 320 may calculate the loss incurred by the classifier model 315 for the plurality of training samples 310 by measuring a discrepancy between the output of the classifier model 315 and the respective true labels of the plurality of training samples 310.

The saliency mask generation component 320 may be configured to compute saliency maps based on a saliency that may consider the gradient of the full loss of the corresponding image. That is, saliency mask generation component 320 may compute, for each training sample of the plurality of training samples 310, a corresponding saliency map based on a gradient of a full loss function of that training sample.

In an embodiment, the saliency mask generation component 320 may provide each training sample of the plurality of training samples 310 to a classifier model 315. Alternatively or additionally, the saliency mask generation component 320 may measure the full loss function between an output of the classifier model 315 and the corresponding label of each training sample of the plurality of training samples 310. In an optional or additional embodiment, the saliency mask generation component 320 may obtain the saliency maps 330 by calculating the gradient of the full loss function.

For example, the saliency mask generation component 320 may, for each training sample of the plurality of training samples 310, calculate the saliency of the image as a magnitude (e.g., Euclidian norm, $\ell\,2$-norm) along a third (e.g., color) dimension of the gradient of the loss incurred by the plurality of training samples 310.

As described herein, the saliency of an image pixel may refer to the importance of that image pixel in making a correct prediction using a model (e.g., classifier model 315, a vision model, and the like). That is, given a training sample $(x,y)$, where $x \in \mathbb{R}^{d \times d \times 3}$ is an RGB (e.g., color) image and $y \in \mathbb{R}^{c}$ is the corresponding one-hot label vector, and a classifier function $f_\theta(\bullet)$ represents the current partially-trained model (e.g., classifier model 315), then the task loss $\ell\,(f_\theta(x),y)$ may measure the discrepancy between the output of the classifier model 315 and the true label (e.g., $y$). For example, the saliency of an image, $s \in \mathbb{R}^{d \times d}$, may be equated to the magnitude of the gradient with respect to the image, and may be represented as an equation similar to Equation 1.

$$s(x) = |\nabla_x \ell\,(f_\theta(x),y)|_{\ell_{2,3}} \qquad \text{[Eq. 1]}$$

Referring to Eq. 1, $|\bullet|_{\ell_{2,3}}$ may represent the $\ell\,2$-norm along the third (e.g., color) dimension.

The saliency maps 330 computed as described above may focus on the foreground objects of the images and/or may ignore background objects that may be irrelevant. As such, the saliency maps 330 may be useful for classification and/or may be better suited for data augmentation and/or may allow for more efficient training, when compared to related saliency maps that may only consider the gradient of the ground-truth class activation map and/or may be based on only the portion of the image that may have been used to classify and/or identify the image.

In an embodiment, the saliency mask generation component 320 may normalize at least one dimension of the gradient of the full loss function, and may apply a Gaussian smoothing parameter to the normalized gradient. That is, the saliency mask generation component 320 may provide, to an optimal re-arrangement component 340, a plurality of smoothed saliency maps 330 that correspond to the plurality of training samples 310. For example, the spatially-normalized and Gaussian-smoothed saliency maps $\tilde{s}$ 330 may be represented as an equation similar to Equation 2.

$$\tilde{s} = \lambda \times \text{Smoothing}\left(s, \sigma^2\right) \qquad \text{[Eq. 2]}$$

Referring to Eq. 2, $\lambda$ may represent a randomly sampled mix ratio, where $\lambda \in [0, 1]$, and $\sigma^2$ may represent a Gaussian smoothing parameter. For example, in some embodiments, $\sigma^2$ may be set to one (1).

The saliency mask generation component 320 may output spatially-normalized and Gaussian-smoothed saliency maps $\tilde{s}$ 330 for each training sample (e.g., image, label pair) of the training samples 310 provided as input to the saliency mask generation component 320. For example, the saliency mask generation component 320 may provide the spatially-normalized and Gaussian-smoothed saliency maps $\tilde{s}$ 330 to the optimal re-arrangement component 340 as input.

FIG. 5 illustrates an example of an optimal re-arrangement component, in accordance with various aspects of the present disclosure. Referring to FIG. 5, a block diagram 500 of an optimal re-arrangement component 340 that implements one or more aspects of the disclosure is illustrated. In some embodiments, at least a portion of the optimal re-arrangement component 340 may be performed by the device 100 of FIG. 1, which may include the SAGE component 180. Alternatively or additionally, another computing device (e.g., a server, a laptop, a smartphone, a UE, a wearable device, a smart device, an IoT device, and the like) that includes the SAGE component 180 may perform at least a portion of the optimal re-arrangement component 340.

The optimal re-arrangement component 340 depicted by the block diagram 500 may include or may be similar in many respects to the optimal re-arrangement component 340 described above with reference to FIG. 3, and may include additional features not mentioned above. Alternatively or additionally, the optimal re-arrangement component 340 may perform at least one of the operations described above with reference to the operation 230 of FIG. 2.

The optimal re-arrangement component 340 may be provided as input at least one of the plurality of training samples 310, the saliency maps s̃ 330 corresponding to the plurality of training samples 310, and a space of all possible translation offsets. For example, the optimal re-arrangement component 340 may be provided with an indication of a plurality of possible arrangements (e.g., positional translations) that may be realized by the plurality of training samples 310.

The optimal re-arrangement component 340 may be configured to produce possible augmentations of the plurality of training samples 310. For example, the optimal re-arrangement component 340 may determine one or more shifting operations that may maximize an overall saliency of a resulting training sample 380.

In an embodiment, a translation operator that may shift a tensor $z$ by $\tau=(\tau_i, \tau_j)$ pixels may be represented as an equation similar to Equation 3.

$$\mathcal{T}(z, \tau)[i, j] = \begin{cases} z[i - \tau_i, j - \tau_j], \text{ if } i - \tau_i \in [0, d - 1], j - \tau_j \in [0, d - 1] \\ 0, \text{ otherwise} \end{cases} \qquad \text{[Eq. 3]}$$

Referring to Eq. 3, $z[i,j]$ may represent the value of $z$ at the location (i,j). That is, the translation $\mathcal{T}$ may shift the values in the tensor $z$ by the given rearrangement offset $\tau$, and/or may zero-pad the empty space. For example, the optimal re-arrangement component 340 may use an equation similar to Eq. 3 to shift at least one training sample with respect to the remaining training samples of the plurality of training samples 310.

Alternatively or additionally, the optimal re-arrangement component 340 may measure the total saliency after the rearrangement in order to determine how successful the given rearrangement may be in resolving the saliency overlap. For example, for a given rearrangement offset $\tau$, a total saliency $v(\tau) \in \mathbb{R}$ may be represented as an equation similar to Equation 4.

$$v(\tau) = \sum_{i,j} [M^\tau \odot \tilde{s}_1 + (1 - M^\tau)T(\tilde{s}_2, \tau)] \qquad \text{[Eq. 4]}$$

$$M^\tau = \frac{\tilde{s}_1}{\tilde{s}_1 + \mathcal{T}(\tilde{s}_2, \tau) + \zeta'} \qquad \text{[Eq. 5]}$$

Referring to Eq. 4, $\mathcal{T}(\tilde{s}_2, \tau)$ may represent the saliency $\tilde{s}_2$ translated by rearrangement offset $\tau$, $M^\tau$ may represent a mixing mask computed with $\tilde{s}_1$ and $\mathcal{T}(\tilde{s}_2, \tau)$ as shown in Eq. 5, and $\odot$ may represent an element-wise product. The computation of a mixing mask M is further described with reference to FIG. 6.

That is, the scalar total saliency $v(\tau)$ may capture the total saliency of the resulting image after the rearrangement (see Eq. 3) and/or fusion (see Eq. 4) of the individual saliency tensors. It may be understood that a larger total saliency value may imply a smaller overlap between the salient regions in the shifted images $x_1$ and $\mathcal{T}(x_2, \tau)$, which may indicate that the resulting image may have more information. Thus, it may be desirable to identify a rearrangement that may maximize the total saliency. In this manner, a blended image in which the original training samples overlap with each other may be avoided. For example, the optimal re-arrangement component 340 may select, from a subset of arrangements of a plurality of possible arrangements, a rearrangement offset that maximizes an overall saliency of a resulting training sample combining the plurality of training samples 310. In an embodiment, the optimal re-arrangement component 340 may obtain an optimal rearrangement offset $\tau^*$ by solving an equation similar to Equation 6.

$$\tau^* = \text{argmax}_{\tau \in O}(v(\tau)) \qquad \text{[Eq. 6]}$$

Referring to Eq. 6, $O$ may represent the space of all possible rearrangement offsets.

In an embodiment, the optimal re-arrangement component 340 may calculate overall saliencies of sample blended images resulting from the distinct positional translations of the plurality of training samples indicated by the subset of arrangements. Alternatively or additionally, the optimal re-arrangement component 340 may select, as the rearrangement offset, an arrangement from the subset of arrangements that corresponds to a maximum overall saliency from among the overall saliencies. However, the present disclosure is not limited in this regard. That is, the rearrangement offset may be selected using any known selection method without deviating from the scope of the disclosure. For example, the optimal re-arrangement component 340 may select a rearrangement offset that may result in an overall saliency that exceeds a predetermined saliency threshold. For another additional or optional example, the optimal re-arrangement component 340 may select a rearrangement offset based on a positional alignment (e.g., vertical, horizontal) of the plurality of training samples in the resulting blended image.

In an optional or additional embodiment, the optimal re-arrangement component 340 may identify the subset of arrangements from the plurality of possible arrangements. For example, each arrangement of the subset of arrangements may indicate a distinct positional translation of the plurality of training samples 310. Alternatively or additionally, the subset of arrangements may include a predetermined portion of the plurality of possible arrangements. For example, the predetermined portion may include approximately one percent (1%) of the plurality of possible arrangements. In another optional or additional embodiment, the subset of arrangements may be randomly selected from the predetermined portion of the plurality of possible arrangements. However, the present disclosure is not limited in this regard. That is, the subset of arrangements may be selected using any known selection method without deviating from the scope of the disclosure.

The optimal re-arrangement component 340 may the output optimal rearrangement offset $\tau^*$ for the plurality of training samples 310. For example, the optimal re-arrangement component 340 may provide the optimal rearrangement offset $\tau^*$ to the saliency-guided mixup component 360 as input.

FIG. 6 depicts an example of saliency-guided mixup, in accordance with various aspects of the present disclosure. Referring to FIG. 6, a block diagram 600 of a saliency-guided mixup component 360 that implements one or more aspects of the disclosure is illustrated. In some embodiments, at least a portion of the saliency-guided mixup component 360 may be performed by the device 100 of FIG. 1, which may include the SAGE component 180. Alternatively or additionally, another computing device (e.g., a server, a laptop, a smartphone, a UE, a wearable device, a smart device, an IoT device, and the like) that includes the SAGE component 180 may perform at least a portion of the saliency-guided mixup component 360.

The saliency-guided mixup component 360 depicted by the block diagram 600 may include or may be similar in many respects to the saliency-guided mixup component 360 described above with reference to FIG. 3, and may include additional features not mentioned above. Alternatively or additionally, the saliency-guided mixup component 360 may perform at least one of the operations described above with reference to the operation 240 of FIG. 2.

The saliency-guided mixup component 360 may be provided as input at least one of the plurality of training samples 310, the saliency maps $\tilde{s}$ 330 corresponding to the plurality of training samples 310, and the optimal rearrangement offset $\tau^*$.

In an embodiment, the saliency-guided mixup component 360 may generate a new training sample 380 (e.g., an image and label pair) by combining (e.g., mixing, blending) the plurality of training samples 310 according to the optimal rearrangement offset $\tau^*$ produced by the optimal re-arrangement component 340 and a plurality of mixing ratios based on the corresponding saliency maps $\tilde{s}$ 330.

Related data augmentation techniques may create a new training sample $(x',y')$ by linearly mixing the plurality of training sample images (e.g., $x_1$ and $x_2$) and their corresponding labels (e.g., $y_1$ and $y_2$). For example, the new training sample may be computed as $x' = \lambda \times x_1 + (1-\lambda) \times x_2$ and $y' = \lambda \times y_1 + (1-\lambda) \times y_2$, where $\lambda \in [0,1]$. However, such an approach may not account for image semantics. That is, at every pixel location, the contribution of $x_1$ and $x_2$ to the new training sample may be constant. As a result, prominent image regions of the new training sample may be suppressed by the background, which may not be preferable for data augmentation.

In an embodiment, the saliency-guided mixup component 360 may calculate a different mixing ratio for each pixel location of the new training sample x', based on the saliency of the corresponding image regions. For example, given two images $x_1$ and $x_2$, and corresponding saliency maps $\tilde{s}_1$ and $\tilde{s}_2$, the saliency-guided mixup component 360 may create a 2D mask $M \in \mathbb{R}^{d \times d}$ that may be represented as an equation similar to Equation 7 and may be used to mix the two images $x_1$ and $x_2$ to create the new training sample $x' \in \mathbb{R}^{d \times d \times 3}$ in a manner similar to Equation 8.

$$M = \frac{\tilde{s}_1}{\tilde{s}_1 + \tilde{s}_2 + \zeta'} \qquad \text{[Eq. 7]}$$

$$x' = M \odot x_1 + (1-M) \odot x_2 \qquad \text{[Eq. 8]}$$

Referring to Eq. 7, $\zeta'$ may represent a scalar hyper-parameter that may be used to avoid a division-by-zero error, and $\odot$ may represent an element-wise product. Continuing to refer to Eq. 7, the elements of M may indicate the saliency ratio between the plurality of training samples 310 at the same location. As such, at any given location, more prominent regions of one training sample may suppress less salient regions of the other image in the final blend. Thus, the new training sample 380 generated by the saliency-guided mixup component 360 may avoid overlapping and/or obscuring of foreground images, and, as a result, may have more information, when compared with related data augmentation techniques. Furthermore, by using an element-wise multiplication for the mixing operation, the computational overhead (e.g., processing throughput, memory footprint, and the like) of the mixing operation may be minimized.

In an optional or additional embodiment, the saliency-guided mixup component 360 may be further configured to generate a new mixed label 380 from corresponding labels of the plurality of training samples 310. For example, the saliency-guided mixup component 360 may mix the labels corresponding to the plurality of input images using an equation similar to Equation 9.

$$y' = \gamma \times y_0 + (1-\gamma) \times y_1 \qquad \text{[Eq. 9]}$$

Referring to Eq. 9, $\gamma$ may represent the mean of the mixing mask M. That is, the saliency-guided mixup component 360 may interpolate the corresponding labels of the plurality of training samples 310 based on the overall saliency of the new mixed image 380.

Related techniques for computing saliency masks may need an extra forward and backward pass of the model (e.g., classifier model 315, vision model). For example, the related saliency computation techniques may discard the intermediate computations and may only use the mask itself for data augmentation. However, such techniques may essentially double the training time of the model. According to aspects of the present disclosure, the SAGE process 200 and/or the process flow 300 may save the gradients $g_s$ with respect to the classifier model 315 parameters, that may be obtained in the backward pass of the saliency map computations (e.g., gradients associated with the original training samples). These standard gradients $g_s$ may be combined with the gradients $g_a$ computed on augmented images to update the final classifier 315 according to an equation similar to Equation 10.

$$g = \eta \times g_s + (1 - \eta) \times g_a \qquad \text{[Eq. 10]}$$

Referring to Eq. 10, hyper-parameter $\eta$ may control how much information from the original images may be used for updates as opposed to the information from the augmented images, where $\eta \in [0,1]$. In this manner, the saliency map computations, using the above-described embodiments (e.g., see Eq. 4), may reuse the intermediate computations of the model and potentially reduce the training time of the model.

In some embodiments, the new training sample 380 generated by the saliency-guided mixup component 360 may be used to augment a training dataset. For example, the new training sample 380 may be used to augment a dataset used to train the classifier model 315. That is, in an embodiment, the process flow 300 may include training the classifier model 315 with the augmented dataset. Alternatively or additionally, the re-trained classifier model 315 may be used to compute a new saliency map corresponding to the plurality of training samples 310. In an optional or additional embodiment, the new saliency map may be different from the previously-computed saliency maps corresponding to the plurality of training samples 310.

As described above with reference to FIGS. 2 to 6, the SAGE process 200 may synthesize new training images (and/or their corresponding labels) by blending a plurality of training samples, using spatial saliency information as guidance for optimal blending. In some embodiments, the SAGE process 200 may be represented as an algorithm similar to Algorithm 1.

---

Algorithm 1: Data Augmentation based on SAGE

---

Input: Training sample pairs $(x_0, y_0)$ and $(x_1, y_1)$, a classifier $f_\theta(\cdot)$, a
　　　loss function $\ell$, a randomly sampled mix ratio $\lambda$, a Gaussian
　　　smoothing parameter $\sigma^2$, and where $\mathcal{O}$ is the space of all
　　　possible image translations
Output: A new data-label pair $(x', y')$.

1　$s_0 = |\nabla_x \ell (f_\theta (x_0), y_0)|_{l_{2,3}}, s_1 = |\nabla_x \ell (f_\theta (x_1), y_1) |_{l_{2,3}}$
2　$\tilde{s}_0 = \lambda \times \text{Smoothing}(s_0, \sigma^2), \tilde{s}_1 = (1 - \lambda) \times \text{Smoothing}(s_1, \sigma^2)$
3　$\tau^* = \text{argmax}_{\tau \in \mathcal{O}}(v(\tau))$, where $v(\tau)$ is defined in Eq. 4

$$4 \quad M^{\tau^*} = \frac{\tilde{s}_0}{\tilde{s}_0 + \mathcal{T}(\tilde{s}_1, \tau^*) + \zeta}$$

$$5 \quad \gamma = \frac{1}{d^2} \sum_{i,j=1}^{d} M_{ij}^{\tau^*}$$

6　$x' = M^{\tau^*} \odot x_0 + (1 - M^{\tau^*}) \odot \mathcal{T}(x_1, \tau^*)$
7　$y' = \gamma \times y_0 + (1 - \gamma) \times y_1$

---

Referring to Algorithm 1, the SAGE process 200 may include computing a saliency (e.g., $s_0$ and $s_1$) for each of the images in the training sample pairs (e.g., $x_0$ and $x_1$) in operation 1. In operation 2, the SAGE process 200 may compute spatially-normalized and Gaussian-smoothed saliency maps (e.g., $\tilde{s}_0$ and $\tilde{s}_1$) for each of the images in the training sample pairs (e.g., $x_0$ and $x_1$). The SAGE process 200 may further include computing an optimal rearrangement offset $\tau^*$ in operation 3. In operation 4, the SAGE process 200 may compute a 2D mask $M^{\tau^*}$ for the training sample pairs (e.g., $x_0$ and $x_1$) arranged using the optimal rearrangement offset $\tau^*$. The SAGE process 200 may further include computing the mean $\gamma$ of the mixing mask $M^{\tau^*}$ in operation 5. In operation 6, the SAGE process 200 may compute create the new training sample image x' based on the training sample pairs (e.g., $x_0$ and $x_1$). The SAGE process 200 may further include interpolating the new training sample label y'.

Advantageously, the SAGE process 200 may compute the saliency of the training sample images (e.g., $x_0$ and $x_1$) in a manner that may consider the gradient of the full loss, unlike related data augmentations techniques that may only consider the gradient of the ground-truth class activation with respect to the input images. As a result, the saliencies computed by the SAGE process 200 may be better suited for data augmentation and/or may allow for more efficient training.

In addition, the SAGE process 200 may produce informative augmentations by shifting one training sample image with respect to the remaining training sample images prior to mixing, by finding the optimal rearrangement offset $\tau^*$ that may maximize the saliency of the resulting image. As a result, the SAGE process 200 may produce informative augmentations even when the original training sample images may have overlapping salient regions.

Furthermore, the SAGE process 200 may generate a new training image by mixing the original training sample images using different mixing ratios at different locations of the mixed image. That is, the SAGE process 200 may promote foreground images (e.g., foreground objects) to be emphasized in the resulting blended image, and thereby, may produce blended images with improved accuracy and/ or robustness, when compared to related data augmentation techniques. Alternatively or additionally, the SAGE process

200 may produce smooth and realistic images with clear and distinct foreground objects without incurring in significant computational overhead (e.g., processing throughput, memory footprint, and the like).

Figure 7:
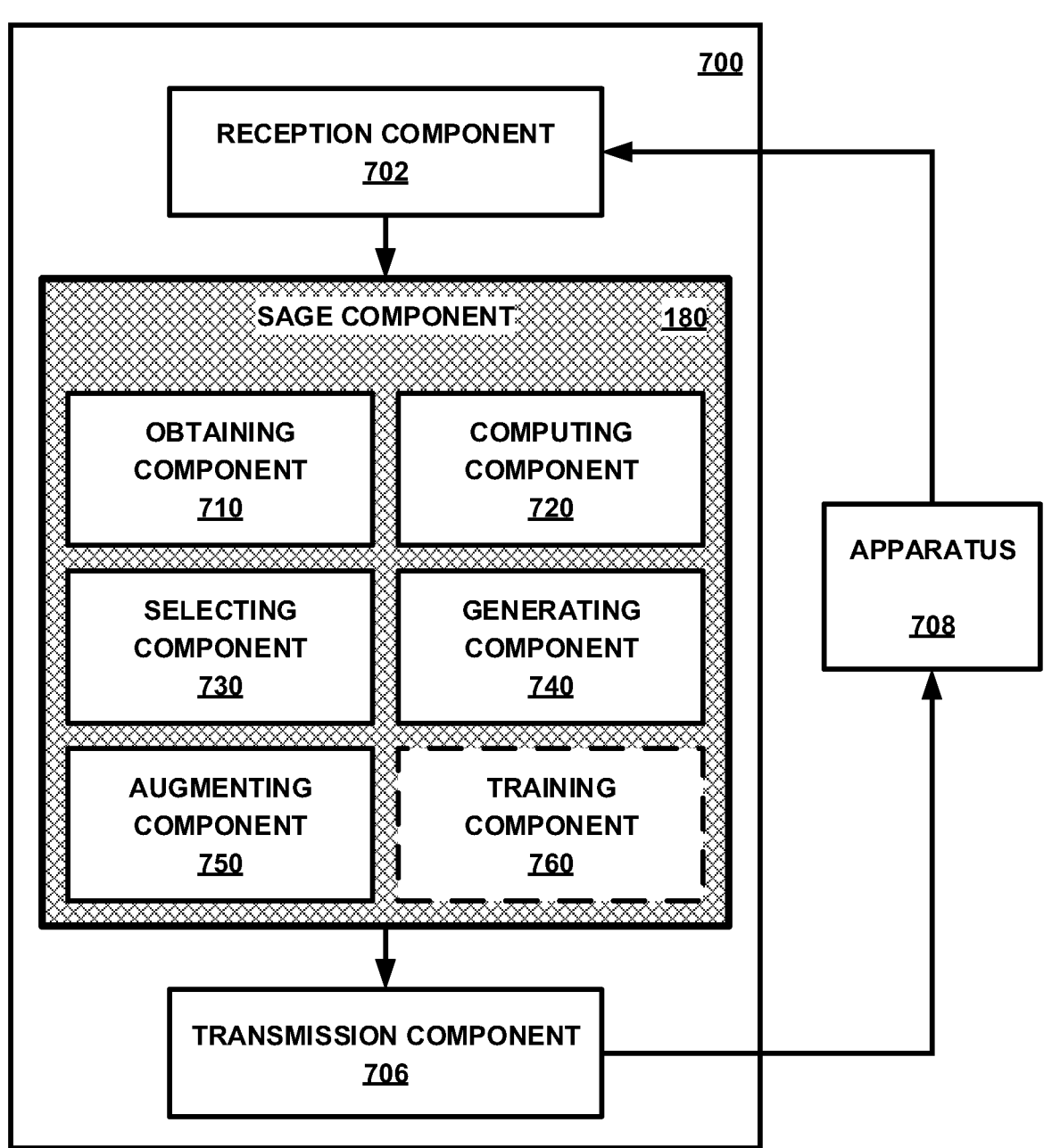
FIG. 7 illustrates a block diagram of an example apparatus for performing SAGE by a device, in accordance with various aspects of the present disclosure.

FIG. 7 illustrates a block diagram of an example apparatus for performing SAGE by a device, in accordance with various aspects of the present disclosure. The apparatus 700 may be a computing device (e.g., device 100 of FIG. 1) and/or a computing device may include the apparatus 700. In some embodiments, the apparatus 700 may include a reception component 702 configured to receive communications (e.g., wired, wireless) from another apparatus (e.g., apparatus 708), a SAGE component 180 configured to perform saliency-guided mixup with optimal re-arrangements for data augmentation, and a transmission component 706 configured to transmit communications (e.g., wired, wireless) to another apparatus (e.g., apparatus 708). The components of the apparatus 700 may be in communication with one another (e.g., via one or more buses or electrical connections). As shown in FIG. 7, the apparatus 700 may be in communication with another apparatus 708 (such as a database, a server, a wearable device, or another computing device) using the reception component 702 and/or the transmission component 706.

In some embodiments, the apparatus 700 may be configured to perform one or more operations described herein in connection with FIGS. 1 to 6. Alternatively or additionally, the apparatus 700 may be configured to perform one or more processes described herein, such as method 800 of FIG. 8. In some embodiments, the apparatus 700 may include one or more components of the device 100 described above in connection with FIG. 1.

The reception component 702 may receive communications, such as control information, data communications, or a combination thereof, from the apparatus 708 (e.g., a database, a server, a wearable device, or another computing device). The reception component 702 may provide received communications to one or more other components of the apparatus 700, such as the SAGE component 180. In some embodiments, the reception component 702 may perform signal processing on the received communications, and may provide the processed signals to the one or more other components. In some embodiments, the reception component 702 may include one or more antennas, a receive processor, a controller/processor, a memory, or a combination thereof, of the device 100 described above with reference to FIG. 1.

The transmission component 706 may transmit communications, such as control information, data communications, or a combination thereof, to the apparatus 708 (e.g., a database, a server, a wearable device, or another computing device). In some embodiments, the SAGE component 180 may generate communications and may transmit the generated communications to the transmission component 706 for transmission to the apparatus 708. In some embodiments, the transmission component 706 may perform signal processing on the generated communications, and may transmit the processed signals to the apparatus 708. In other embodiments, the transmission component 706 may include one or more antennas, a transmit processor, a controller/processor, a memory, or a combination thereof, of the device 100 described above with reference to FIG. 1. In some embodiments, the transmission component 706 may be co-located with the reception component 702 such as in a transceiver and/or a transceiver component.

The SAGE component 180 may be configured to perform saliency-guided mixup with optimal re-arrangements for data augmentation. In some embodiments, the SAGE component 180 may include a set of components, such as an obtaining component 710 configured to obtain a plurality of images from a dataset, a computing component 720 configured to compute corresponding saliency maps, a selecting component 730 configured to select a rearrangement offset that maximizes an overall saliency, a generating component 740 configured to generate a new mixed image and a new mixed label, and an augmenting component 750 configured to augment the dataset.

Alternatively or additionally, the SAGE component 180 may further include a training component 760 configured to train a classifier model 315 with the augmented dataset.

In some embodiments, the set of components may be separate and distinct from the SAGE component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1 and 7.

Referring to FIG. 8, in operation, an apparatus 700 may perform a method 800 of performing data augmentation. The method 800 may be performed by the device 100 (which may include the processor 120, the memory 130, and the storage component 140, and which may be the entire device 100 and/or include one or more components of the device 100, such as the input component 150, the output component 160, the communication interface 170, and/or the SAGE component 180) and/or the apparatus 700. The method 800 may be performed by the device 100, the apparatus 700, and/or the SAGE component 180 in communication with the apparatus 708 (e.g., a database, a server, a wearable device, or another computing device).

At block 810 of FIG. 8, the method 800 may include obtaining a plurality of images from a dataset, each image of the plurality of images having a corresponding label. For example, in an aspect, the device 100, the SAGE component 180, and/or the obtaining component 710 may be configured to or may include means for obtaining a plurality of images 310 from a dataset, each image of the plurality of images 310 having a corresponding label.

For example, the obtaining at block 810 may include randomly selecting the plurality of images 310 from an available training dataset, as described above with reference to FIG. 3.

Further, for example, the obtaining at block 810 may be performed to provide the SAGE component 180 with the training samples that are to be used to synthesize new training images (and/or their corresponding labels) by blending the plurality of images 310.

At block 820 of FIG. 8, the method 800 may include computing, for each image of the plurality of images, a corresponding saliency map based on a gradient of a full loss function of that image. For example, in an aspect, the device 100, the SAGE component 180, and/or the computing component 720 may be configured to or may include means for computing, for each image of the plurality of images 310, a corresponding saliency map 330 based on a gradient of a full loss function of that image.

For example, the computing at block 820 may include calculating the saliency of each image of the plurality of images 310 as a magnitude (e.g., Euclidian norm, $\ell$ 2-norm) along a third (e.g., color) dimension of the gradient of the loss incurred by the plurality of images 310, as described above with reference to FIG. 4.

In some embodiments, the computing at block 820 may include providing each image of the plurality of images 310 to a classifier model 315.

In optional or additional embodiments, the computing at block 820 may include measuring the full loss function between an output of the classifier model 315 and the corresponding label of that image 310.

In other optional or additional embodiments, the computing at block 820 may include obtaining the corresponding saliency map 330 by calculating the gradient of the full loss function.

In other optional or additional embodiments, the computing at block 820 may include normalizing at least one dimension of the gradient of the full loss function.

In other optional or additional embodiments, the computing at block 820 may include applying a Gaussian smoothing parameter to the normalized gradient.

Further, for example, the computing at block 820 may be performed to calculate the saliency of each image of the plurality of images 310 in a manner that may consider the gradient of the full loss, unlike related data augmentations techniques that may only consider the gradient of the ground-truth class activation with respect to the input images. As a result, the saliencies computed at block 820 may be better suited for data augmentation and/or may allow for more efficient training.

At block 830 of FIG. 8, the method 800 may include selecting, from a subset of arrangements of a plurality of possible arrangements, a rearrangement offset that maximizes an overall saliency of a resulting image combining the plurality of images. For example, in an aspect, the device 100, the SAGE component 180, and/or the selecting component 730 may be configured to or may include means for selecting, from a subset of arrangements of a plurality of possible arrangements, a rearrangement offset that maximizes an overall saliency of a resulting image combining the plurality of images 310.

For example, the selecting at block 830 may include measuring the total saliency after the rearrangement in order to determine how successful the given rearrangement may be in resolving the saliency overlap, as described above with reference to FIG. 5.

In some embodiments, the selecting at block 830 may include identifying the subset of arrangements from the plurality of possible arrangements. Each arrangement of the subset of arrangements may indicate a distinct positional translation of the plurality of images 310. The subset of arrangements may include a predetermined portion of the plurality of possible arrangements.

In optional or additional embodiments, the selecting at block 830 may include calculating overall saliencies of sample images resulting from the distinct positional translations of the plurality of images 310 indicated by the subset of arrangements.

In optional or additional embodiments, the selecting at block 830 may include selecting, as the rearrangement offset, an arrangement from the subset of arrangements corresponding to a maximum overall saliency from among the overall saliencies.

In optional or additional embodiments, the selecting at block 830 may include randomly identifying the predetermined portion of the plurality of possible arrangements as the subset of arrangements. The predetermined portion may include approximately one percent (1%) of the plurality of possible arrangements.

Further, for example, the selecting at block 830 may be performed to produce informative augmentations by finding the optimal rearrangement offset that may maximize the saliency of the resulting image. As a result, the selecting at block 830 may produce informative augmentations even when the original training sample images may have overlapping salient regions.

At block 840 of FIG. 8, the method 800 may include generating, using the rearrangement offset and a plurality of mixing ratios based on the corresponding saliency maps 330, a new mixed image from the plurality of images 310 and a new mixed label from corresponding labels of the plurality of images. For example, in an aspect, the device 100, the SAGE component 180, and/or the generating component 740 may be configured to or may include means for generating, using the rearrangement offset and a plurality of mixing ratios based on the corresponding saliency maps 330, a new mixed image from the plurality of images 310 and a new mixed label from corresponding labels of the plurality of images 310.

For example, the generating at block 840 may include generating a new training sample 380 (e.g., an image and label pair) by combining (e.g., mixing, blending) the plurality of training samples 310 according to the optimal rearrangement offset τ* produced by the optimal re-arrangement component 340 and a plurality of mixing ratios based on the corresponding saliency maps $\tilde{s}$ 330, as described above with reference to FIG. 6.

In some embodiments, the generating at block 840 may include creating a 2D mask comprising the plurality of mixing ratios corresponding to a ratio between saliencies of the plurality of images 310 at each pixel location of the new mixed image.

In optional or additional embodiments, the generating at block 840 may include mixing, using the 2D mask, the plurality of images 310, having been positioned according to the rearrangement offset, into the new mixed image.

In optional or additional embodiments, the generating at block 840 may include interpolating the corresponding labels of the plurality of images 310 based on the overall saliency of the new mixed image.

Further, for example, the generating at block 840 may be performed to generate augmented training samples that emphasize foreground images (e.g., foreground objects) in the resulting blended image, and thereby, may produce blended images with improved accuracy and/or robustness, when compared to related data augmentation techniques. In addition, the generating at block 840 may be performed to produce smooth and realistic images with clear and distinct foreground objects without incurring in significant computational overhead (e.g., processing throughput, memory footprint, and the like).

At block 850 of FIG. 8, the method 800 may include augmenting the dataset with the new mixed image and the new mixed label. For example, in an aspect, the device 100, the SAGE component 180, and/or the augmenting component 750 may be configured to or may include means for augmenting the dataset with the new mixed image and the new mixed label.

For example, the augmenting at block 850 may include augmenting a training dataset with the new training sample 380 generated by the saliency-guided mixup component 360, as described above with reference to FIG. 3. For example, the new training sample 380 may be used to augment a dataset used to train the classifier model 315.

Further, for example, the augmenting at block 850 may be performed to build practical vision models that may be more generalizable and/or may have improved performance in OOD and/or zero/few-shot settings, when compared to related data augmentation techniques.

In an optional or additional aspect that may be combined with any other aspect, the method 800 may further include training a classifier model 315 with the augmented dataset, the plurality of images 310 including a first image and the first image having a first corresponding saliency map. For example, in an aspect, the device 100, the SAGE component 180, and/or the training component 760 may be configured to or may include means for training a classifier model 315 with the augmented dataset.

In this optional or additional aspect, the method 800 may further include computing, using the trained classifier model 315, a new saliency map corresponding to the first image. For example, in an aspect, the device 100, the SAGE component 180, and/or the computing component 720 may be configured to or may include means for computing, using the trained classifier model 315, a new saliency map corresponding to the first image.

In some embodiments, the new saliency map of the first image may be different from the first corresponding saliency map of the first image. That is, the new saliency map may be different from a previously-computed saliency map using the classifier model 315 before the classifier model 315 was trained with the augmented dataset.

The following aspects are illustrative only and aspects thereof may be combined with aspects of other embodiments or teaching described herein, without limitation.

Aspect 1 is a method of performing data augmentation by a device. The method includes obtaining a plurality of images 310 from a dataset. Each image of the plurality of images 310 has a corresponding label. The method further includes computing, for each image of the plurality of images 310, a corresponding saliency map 330 based on a gradient of a full loss function of that image. The method further includes selecting, from a subset of arrangements of a plurality of possible arrangements, a rearrangement offset that maximizes an overall saliency of a resulting image combining the plurality of images 310. The method further includes generating, using the rearrangement offset and a plurality of mixing ratios based on the corresponding saliency maps 330, a new mixed image from the plurality of images 310 and a new mixed label from corresponding labels of the plurality of images 310. The method further includes augmenting the dataset with the new mixed image and the new mixed label.

In Aspect 2, the method of Aspect 1, may include providing each image of the plurality of images 310 to a classifier model 315, measuring the full loss function between an output of the classifier model 315 and the corresponding label of that image, and obtaining the corresponding saliency map 330 by calculating the gradient of the full loss function.

In Aspect 3, the method of any of Aspects 1 or 2, may include normalizing at least one dimension of the gradient of the full loss function, and applying a Gaussian smoothing parameter to the normalized gradient.

In Aspect 4, the method of any of Aspects 1 to 3 may include identifying the subset of arrangements from the plurality of possible arrangements. Each arrangement of the subset of arrangements may indicate a distinct positional translation of the plurality of images 310. The subset of arrangements may include a predetermined portion of the plurality of possible arrangements. The method of Aspect 4 may further include calculating overall saliencies of sample images resulting from the distinct positional translations of the plurality of images 310 indicated by the subset of arrangements. The method of Aspect 4 may further include selecting, as the rearrangement offset, an arrangement from the subset of arrangements corresponding to a maximum overall saliency from among the overall saliencies.

In Aspect 5, the method of any of Aspects 1 to 4 may include randomly identifying the predetermined portion of the plurality of possible arrangements as the subset of arrangements. The predetermined portion may include approximately one percent (1%) of the plurality of possible arrangements.

In Aspect 6, the method of any of Aspects 1 to 5 may include creating a 2D mask including the plurality of mixing ratios corresponding to a ratio between saliencies of the plurality of images 310 at each pixel location of the new mixed image. The method of Aspect 6 may further include mixing, using the 2D mask, the plurality of images 310, having been positioned according to the rearrangement offset, into the new mixed image.

In Aspect 7, the method of any of Aspects 1 to 6 may include interpolating the corresponding labels of the plurality of images 310 based on the overall saliency of the new mixed image.

In Aspect 8, in the method of any of Aspects 1 to 7, the plurality of images 310 may include a first image. The first image may have a first corresponding saliency map 330. The method of Aspect 8 may include training a classifier model 315 with the augmented dataset. The method of Aspect 8 may further include computing, using the trained classifier model 315, a new saliency map corresponding to the first image. The new saliency map may be different from the first corresponding saliency map 330.

Aspect 9 is an apparatus for performing data augmentation by a device. The apparatus includes a memory storage storing computer-executable instructions, and a processor communicatively coupled to the memory storage. The processor is configured to execute the computer-executable instructions and cause the apparatus to perform one or more of the methods of any of Aspects 1 to 8.

Aspect 10 is an apparatus for data augmentation to be performed by a device including means for performing one or more of the methods of any of Aspects 1 to 8.

Aspect 11 is a non-transitory computer-readable storage medium storing computer-executable instructions for performing data augmentation by a device. The computer-executable instructions are configured, when executed by one or more processors of the device, to cause the device to perform one or more of the methods of any of Aspects 1 to 8.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 3 to 7) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of performing data augmentation by a device, comprising:
  obtaining a plurality of images from a dataset, each image of the plurality of images having a corresponding label;
  computing, for each image of the plurality of images, a corresponding saliency map based on a gradient of a full loss function of that image;
  selecting, from a subset of arrangements of a plurality of possible arrangements, a rearrangement offset that maximizes an overall saliency of a resulting image combining the plurality of images;
  computing, based on the corresponding saliency maps, a two-dimensional mixing mask, wherein the two-dimensional mixing mask includes, for each pixel location, a different mixing ratio determined based on saliency values of the plurality of images at a same pixel location, wherein elements of the two-dimensional mixing mask indicate a saliency ratio between the plurality of images at the same pixel location;
  generating, using the rearrangement offset and the two-dimensional mixing mask, a new mixed image by element-wise combining the plurality of images and a new mixed label from corresponding labels of the plurality of images; and
  augmenting the dataset with the new mixed image and the new mixed label.

2. The method of claim 1, wherein the computing, for each image of the plurality of images, of the corresponding saliency map comprises:
  providing that image of the plurality of images to a classifier model;
  measuring the full loss function between an output of the classifier model and the corresponding label of that image; and
  obtaining the corresponding saliency map by calculating the gradient of the full loss function.

3. The method of claim 2, wherein the obtaining of the corresponding saliency map comprises:
  normalizing at least one dimension of the gradient of the full loss function; and
  applying a Gaussian smoothing parameter to the normalized gradient.

4. The method of claim 1, wherein the selecting of the rearrangement offset comprises:
  identifying the subset of arrangements from the plurality of possible arrangements, each arrangement of the subset of arrangements indicating a distinct positional translation of the plurality of images, the subset of arrangements comprising a predetermined portion of the plurality of possible arrangements;
  calculating overall saliencies of sample images resulting from the distinct positional translations of the plurality of images indicated by the subset of arrangements; and
  selecting, as the rearrangement offset, an arrangement from the subset of arrangements corresponding to a maximum overall saliency from among the overall saliencies.

5. The method of claim 4, wherein the identifying of the subset of arrangements comprises:
  randomly identifying the predetermined portion of the plurality of possible arrangements as the subset of arrangements, the predetermined portion comprising approximately one percent (1%) of the plurality of possible arrangements.

6. The method of claim 1, wherein the generating of the new mixed label comprises:

interpolating the corresponding labels of the plurality of images based on the overall saliency of the new mixed image.

7. The method of claim 1, wherein:

the plurality of images comprises a first image, the first image having a first corresponding saliency map, the method further comprises:

training a classifier model with the augmented dataset; and computing, using the trained classifier model, a new saliency map corresponding to the first image, and wherein the new saliency map is different from the first corresponding saliency map.

8. A device for performing data augmentation, comprising:

a memory storing instructions; and a processor communicatively coupled to the memory, wherein the processor is configured to execute the instructions to:

obtain a plurality of images from a dataset, each image of the plurality of images having a corresponding label;

compute, for each image of the plurality of images, a corresponding saliency map based on a gradient of a full loss function of that image;

select, from a subset of arrangements of a plurality of possible arrangements, a rearrangement offset that maximizes an overall saliency of a resulting image combining the plurality of images;

compute, based on the corresponding saliency maps, a two-dimensional mixing mask, wherein the two-dimensional mixing mask includes, for each pixel location, a different mixing ratio determined based on saliency values of the plurality of images at a same pixel location, wherein elements of the two-dimensional mixing mask indicate a saliency ratio between the plurality of images at the same pixel location;

generate, using the rearrangement offset and the two-dimensional mixing mask, a new mixed image by element-wise combining the plurality of images and a new mixed label from corresponding labels of the plurality of images; and augment the dataset with the new mixed image and the new mixed label.

9. The device of claim 8, the processor is further configured to execute the instructions to:

provide each image of the plurality of images to a classifier model;

measure the full loss function between an output of the classifier model and the corresponding label of each image of the plurality of images; and obtain the corresponding saliency map by calculating the gradient of the full loss function.

10. The device of claim 9, the processor is further configured to execute the instructions to:

normalize at least one dimension of the gradient of the full loss function; and apply a Gaussian smoothing parameter to the normalized gradient.

11. The device of claim 8, the processor is further configured to execute the instructions to:

identify the subset of arrangements from the plurality of possible arrangements, each arrangement of the subset of arrangements indicating a distinct positional translation of the plurality of images, the subset of arrangements comprising a predetermined portion of the plurality of possible arrangements;

calculate overall saliencies of sample images resulting from the distinct positional translations of the plurality of images indicated by the subset of arrangements; and select, as the rearrangement offset, an arrangement from the subset of arrangements corresponding to a maximum overall saliency from among the overall saliencies.

12. The device of claim 11, the processor is further configured to execute the instructions to:

randomly identify the predetermined portion of the plurality of possible arrangements as the subset of arrangements, the predetermined portion comprising approximately one percent (1%) of the plurality of possible arrangements.

13. The device of claim 8, the processor is further configured to execute the instructions to:

interpolate the corresponding labels of the plurality of images based on the overall saliency of the new mixed image.

14. The device of claim 8, wherein:

the plurality of images comprises a first image, the first image having a first corresponding saliency map, the processor is further configured to execute the instructions to:

train a classifier model with the augmented dataset; and compute, using the trained classifier model, a new saliency map corresponding to the first image, and wherein the new saliency map is different from the first corresponding saliency map.

15. A non-transitory computer-readable storage medium storing computer-executable instructions for performing data augmentation that, when executed by at least one processor of a device, cause the device to:

obtain a plurality of images from a dataset, each image of the plurality of images having a corresponding label;

compute, for each image of the plurality of images, a corresponding saliency map based on a gradient of a full loss function of that image;

select, from a subset of arrangements of a plurality of possible arrangements, a rearrangement offset that maximizes an overall saliency of a resulting image combining the plurality of images;

compute, based on the corresponding saliency maps, a two-dimensional mixing mask, wherein the two-dimensional mixing mask includes, for each pixel location, a different mixing ratio determined based on saliency values of the plurality of images at a same pixel location, wherein elements of the two-dimensional mixing mask indicate a saliency ratio between the plurality of images at the same pixel location;

generate, using the rearrangement offset and the two-dimensional mixing mask, a new mixed image by element-wise combining the plurality of images and a new mixed label from corresponding labels of the plurality of images; and augment the dataset with the new mixed image and the new mixed label.

16. The non-transitory computer-readable storage medium of claim 15, wherein the computer-executable instructions, when executed by the at least one processor, further cause the device to:

provide each image of the plurality of images to a classifier model;

measure the full loss function between an output of the classifier model and the corresponding label of each image of the plurality of images; and obtain the corresponding saliency map by calculating the gradient of the full loss function.

17. The non-transitory computer-readable storage medium of claim 15, wherein the computer-executable instructions, when executed by the at least one processor, further cause the device to:

identify the subset of arrangements from the plurality of possible arrangements, each arrangement of the subset of arrangements indicating a distinct positional translation of the plurality of images, the subset of arrangements comprising a predetermined portion of the plurality of possible arrangements;

calculate overall saliencies of sample images resulting from the distinct positional translations of the plurality of images indicated by the subset of arrangements; and select, as the rearrangement offset, an arrangement from the subset of arrangements corresponding to a maximum overall saliency from among the overall saliencies.

18. The method of claim 1, wherein the computing of the two-dimensional mixing mask comprises:

computing, for each pixel location, the saliency ratio between the plurality of images by dividing a saliency value of a first image by a sum of saliency values of the plurality of images and a scalar parameter used to avoid a division-by-zero error.

\* \* \* \* \*